(12) United States Patent
Sanders

(10) Patent No.: US 7,131,553 B2
(45) Date of Patent: *Nov. 7, 2006

(54) CELLULAR RESERVOIR FLEXIBLE PRESSURE VESSEL, APPARATUS AND METHOD FOR MAKING SAME

(76) Inventor: Stan A. Sanders, 16510 Blenham Way, Chesterfield, MI (US) 63005

( * ) Notice: Subject to any disclaimer, the term of this patent is extended or adjusted under 35 U.S.C. 154(b) by 507 days.

This patent is subject to a terminal disclaimer.

(21) Appl. No.: 10/637,218

(22) Filed: Aug. 8, 2003

(65) Prior Publication Data

US 2004/0108098 A1 Jun. 10, 2004

Related U.S. Application Data

(63) Continuation-in-part of application No. 10/294,825, filed on Nov. 13, 2002, now Pat. No. 6,796,453.

(51) Int. Cl.
*F17C 1/00* (2006.01)

(52) U.S. Cl. .................................................. 220/581
(58) Field of Classification Search ................ None
See application file for complete search history.

(56) References Cited

U.S. PATENT DOCUMENTS

| | | | |
|---|---|---|---|
| 3,750,907 A | 8/1973 | Steele | |
| 3,802,594 A | 4/1974 | Lemelson | |
| 3,959,058 A | 5/1976 | Rath et al. | |
| 4,061,457 A | 12/1977 | Butler | |
| 4,106,528 A * | 8/1978 | Laing | 138/149 |
| 4,484,691 A | 11/1984 | Lees | |
| 4,624,657 A | 11/1986 | Gould et al. | |
| 4,650,452 A | 3/1987 | Jensen | |
| 4,673,002 A * | 6/1987 | Scanlon et al. | 138/149 |
| 4,759,472 A | 7/1988 | Strenger | |
| 4,954,678 A | 9/1990 | Harmony et al. | |
| 5,093,546 A | 3/1992 | Matsumiya et al. | |
| 5,160,396 A | 11/1992 | Jensen et al. | |
| 5,333,763 A | 8/1994 | Lane et al. | |
| 5,460,762 A | 10/1995 | Andre | |
| 5,516,004 A | 5/1996 | Lane | |
| 5,906,205 A | 5/1999 | Heibert | |
| 5,932,132 A | 8/1999 | Plemons | |
| 6,134,970 A | 10/2000 | Kumakawa et al. | |
| 6,161,624 A | 12/2000 | Bennett | |
| 6,226,933 B1 | 5/2001 | Nelson et al. | |
| 6,796,453 B1 * | 9/2004 | Sanders | 220/581 |

* cited by examiner

*Primary Examiner*—Stephen Castellano
(74) *Attorney, Agent, or Firm*—David A. Belasco; Belasco Jacobs & Townsley, LLP

(57) ABSTRACT

A cellular reservoir flexible pressure vessel is formed as a series of closely packed tubes fitted into a pair of opposing end caps. The end caps have individual receptacles sized and shaped to receive the tube ends that are secured with adhesive or radio frequency welding. At least one end cap has a passageway for connection of the vessel. The flexible pressure vessel has a pressure relief device comprising a reduction in thickness of one end cap at a predetermined location. When subjected to overpressure it fails at the predetermined location. Other pressure relief devices include: a projecting member on the vessel surface, a weakened section of the passageway, a weakening or an absence of braiding material or hoop winding at a predetermined location on the vessel surface or along the passageway, a weakening or spreading of fibers in either the reinforcing panels or the flexible blankets covering the vessel.

47 Claims, 27 Drawing Sheets

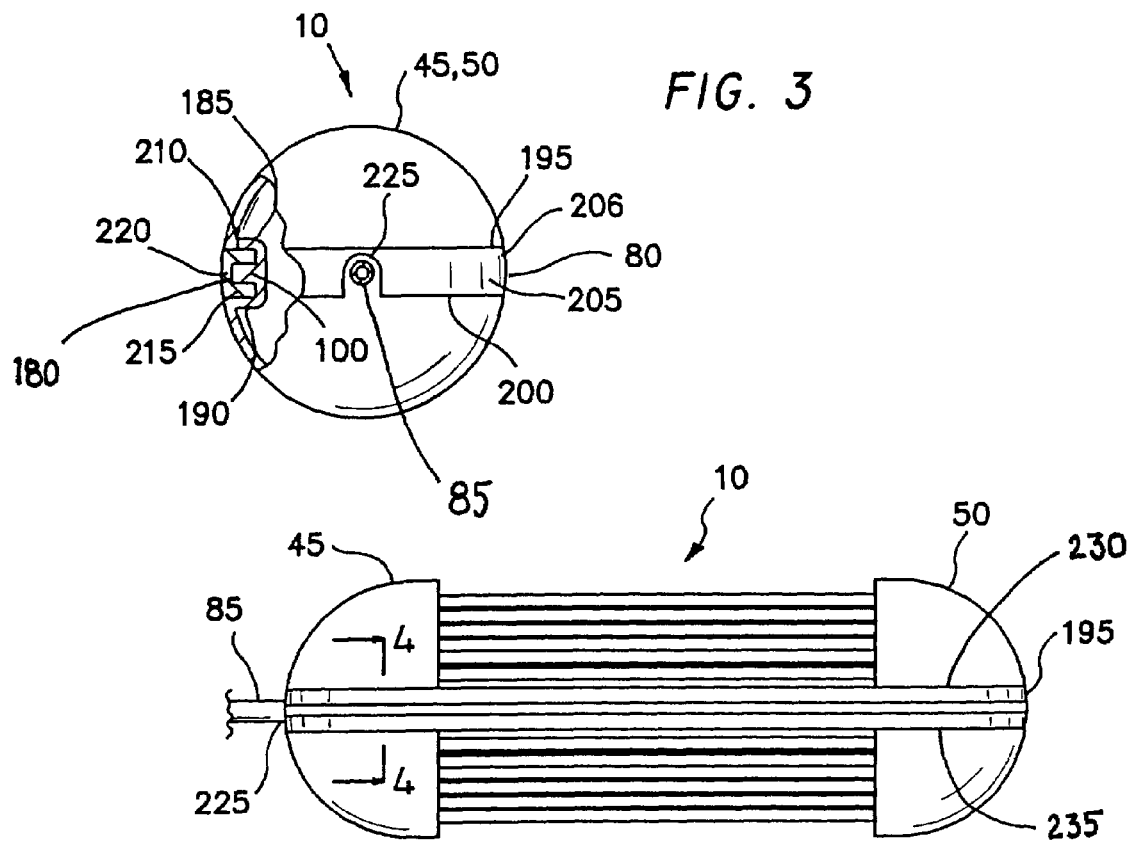

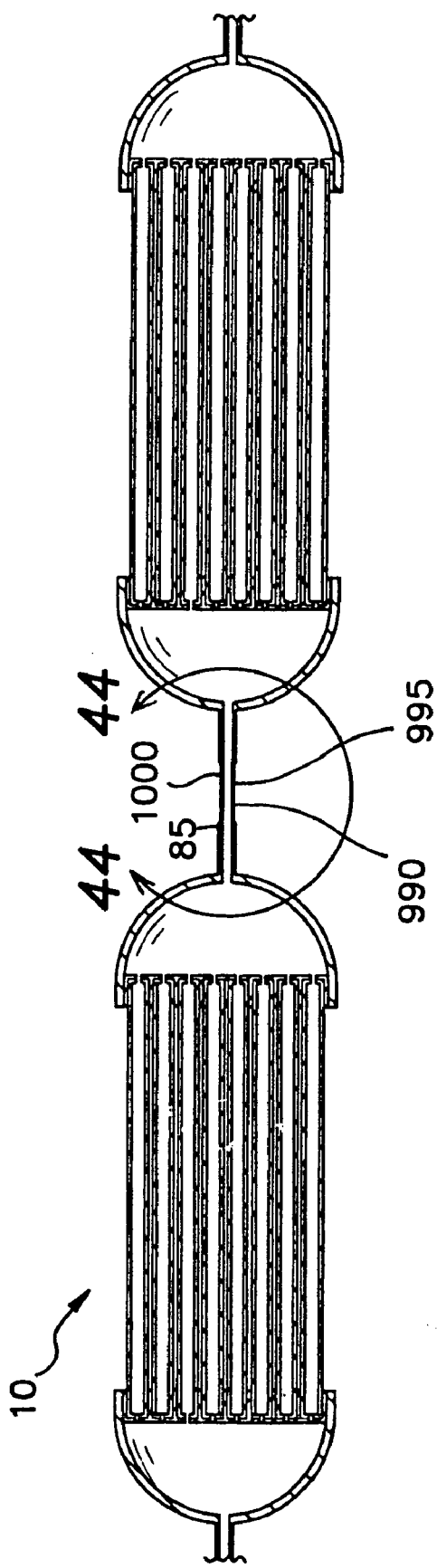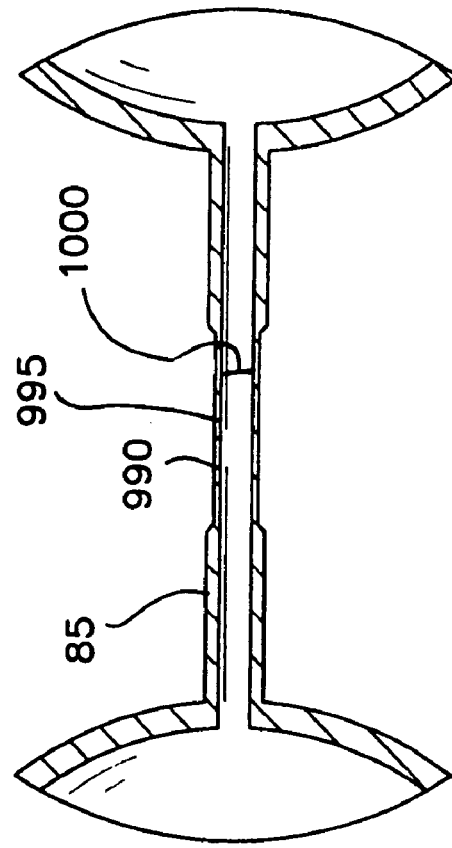
FIG. 43
FIG. 44

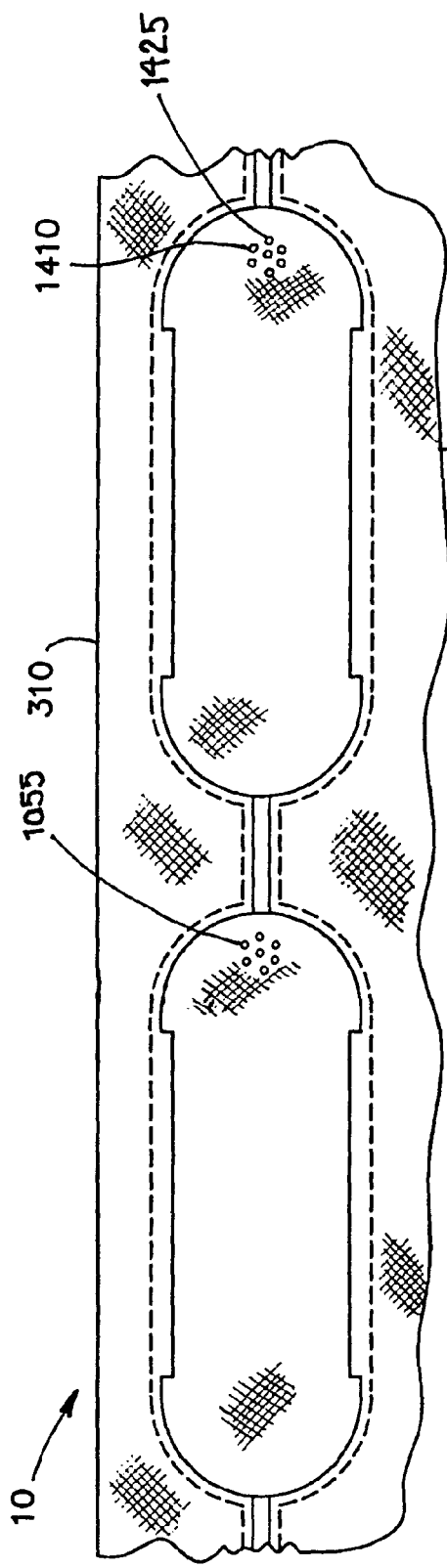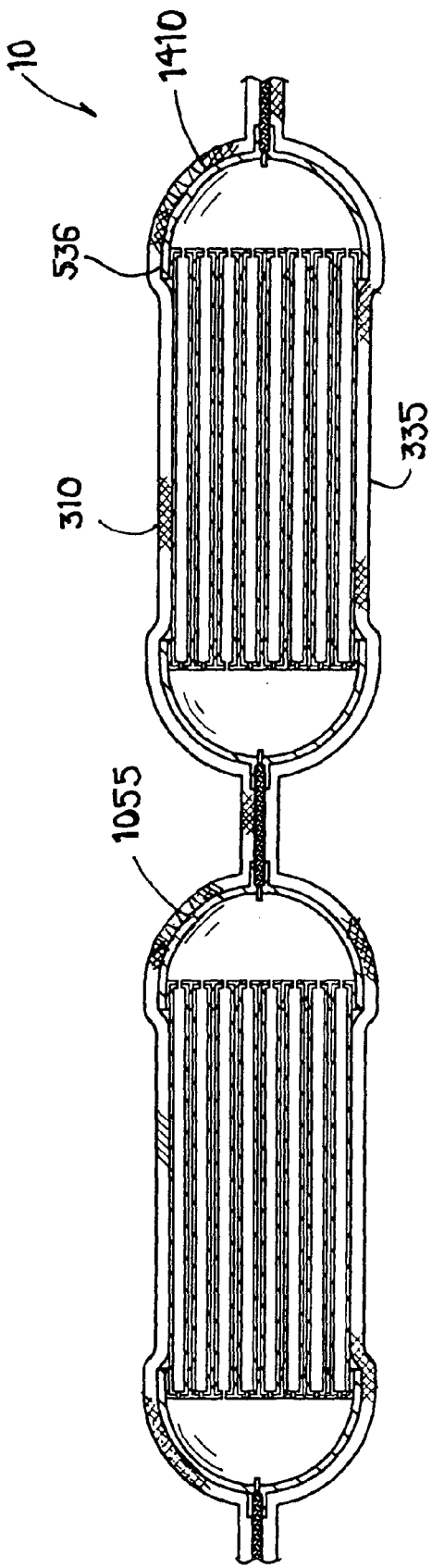

CELLULAR RESERVOIR FLEXIBLE PRESSURE VESSEL, APPARATUS AND METHOD FOR MAKING SAME

EARLIER FILED APPLICATION

The instant application is a continuation-in-part of applicant's prior application filed Nov. 13, 2002 and having Ser. No. 10/294,825, now U.S. Pat. No. 6,796,453, the disclosure of which is specifically incorporated by reference herein.

FIELD OF INVENTION

The invention pertains to devices for storing gases and fluids under pressure. More particularly, the invention relates to pressure vessels that are formed out of flexible materials and that can be made to conform to a variety of shapes.

BACKGROUND OF THE INVENTION

Typically, pressure vessels capable of containing liquids or gases at significant pressures have involved fixed shape cylinders or spheres formed of high-strength metals such as steel or aluminum. Such pressure vessels, while successful for their designed applications, involve a number of problems. First, such metallic cylinders are relatively heavy compared to the gases or fluids that they contain. Second, pressure cylinders contain all of the gas or liquid in a single space. Should the vessel rupture, the entire vessel is destroyed, often with a violent explosion sending shards of metal in all directions. Third, metallic cylinders have a definite shape and cannot be adapted to fit readily in many space-constrained applications. The present invention involves a number of small cells of an elongated tubular shape linked to each other by collecting end caps. The result of this design is that the pressure vessel may be readily formed into a variety of useful shapes to accommodate special applications. A pressure vessel of this type can be lightweight, adaptable to a variety of spaces and unusual applications, and is inherently safer in rupture situations.

A particular problem associated with pressure vessels operated at high pressure is the conditions under which they fail. Metallic cylinders are particularly dangerous in this regard as they may fragment suddenly if aged or fatigued from many use cycles, even if equipped with overpressure release devices. The present invention provides for a number of controlled pressure release mechanisms that are easily incorporated into the flexible pressure vessels.

The use of numerous small linked pressure vessels also present problems related to effectively joining such vessels together. The present invention provides for novel manufacturing methods for joining such cells.

Various designs have been developed using elongated tubular shaped vessels, most in the area of radiators and heat exchangers. U.S. Pat. No. 6,390,187 issued to Marechal et al. discloses a heat exchanger with flexible tubes. The tubes may be made from a plastic material and are designed to carry a heat-exchanging fluid capable of cooperating with an air stream circulating through the exchanger. The invention is intended to describe the method by which the tubes are maintained in parallel rows. The tubes are made from a plastic material and communicate by way of their extremities with two manifolds. The manifolds include collector plates equipped with apertures that thus form a means for holding the tubes in place. The tubes are arranged in rows that are parallel to one another by a distance corresponding to the tube thickness so that the various rows are adjacent in pairs of respective tubes of two consecutive pairs. The tubes generally exhibit a sinusoidal shape and thus aligned for expanding and contraction so that the tubes may utilize the flexible characteristics and maintain the integrity of the system.

U.S. Pat. No. 4,450,902 issued to Bosne, is directed to a heat exchanger in particular for an atmospheric cooling tower. The exchanger utilizes synthetic plastic material for the tubes that has one fixed header while the remainder of the exchanger is mounted by suspension to allow for free expansion. A chamber has a heat exchanger with a series of tubes extending throughout the length of chamber. The exchanger comprises a battery of smooth tubes made of a synthetic material. The tubes of the heat exchanger are fixed to the support structure at one of the ends and is freely suspended by a suspension members to allow for expansion and contraction.

U.S. Pat. No. 5,158,134, issued to Mongia et al., discloses a fully floating tube bundle. The exchanger comprises a plurality of fluid carrying tubes that is free floating with no direct contact between the end plates or center plate. Thus, the tubes are free to move with respect to the end plates and center plate as to eliminate damage by vibration and temperature changes.

U.S. Pat. No. 4,114,683 issued to Verlinden describes a flexible tube type fluid-fluid heat exchanger. The exchanger comprises a plurality of flexible synthetic tubes extending in a curved path between a pair of headers. The tubes are connected to headers and are constructed of a flexible plastic material so they may easily conform to the curvature of the wall 11.

U.S. Pat. No. 5,651,474 issued to Callaghan et al is directed to cryogenic structures that are vessels made of a durable plastic material and are adapted to contain cryogenic materials such as fuel. The structures are made of a fiber network impregnated with a matrix of thermal set plastics and have three tank lobes of a composite plastic reinforced with fibers. The tank lobes may be filament-wound on a rotating mandrel while the fibers are pre-impregnated with resin. Another technique is to heat the tank skins allowing the pre-impregnated fiber layers to fuse together and then cool so as to set up a solid matrix that grips the fibers.

While other variations exist, the above-described designs involving elongated tubular shaped vessels are typical of those encountered in the prior art. It is an objective of the present invention to provide a flexible pressure vessel that is capable of maintaining gasses or liquids at relatively high pressures. It is a further objective to provide this capability in a vessel that is light in weight and that presents a significantly reduced risk of injury in rupture situations. It is a still further objective of the invention to provide a pressure vessel that may be easily adapted to a variety of space constraints. It is yet a further objective to provide a pressure vessel that is durable, easily serviced, and that may be produced inexpensively.

While some of the objectives of the present invention are disclosed in the prior art, none of the inventions found include all of the requirements identified.

SUMMARY OF THE INVENTION (1) A cellular reservoir flexible pressure vessel providing the desired features may be constructed from the following components. A plurality of flexible tubes is provided. Each of the flexible tubes are formed of resilient material and have an outer surface, an inner surface, a first end and a second end.

First and second end caps are provided. Each of the end caps have a receptacle for either of the first or second ends of each of the flexible tubes, a collecting reservoir, a surrounding outer rim and an outer perimeter perpendicular to the surrounding outer rim. At least one of the first and second end caps have a passageway connecting to the collecting reservoir for connection to either a passageway of another pressure vessel or a valve. Each of the receptacles has a surrounding wall, a base and an orifice penetrating the base and connects the receptacle to either the collecting reservoir or the passageway. The wall has an interior surface. The interior surface is sized and shaped to fit frictionally over the outer surface of one of the flexible tubes at either the first or second ends. The collecting reservoir has an outer surface and connects the base of each of the receptacles to a common space. The common space is either closed or connected to the passageway. The surrounding outer rim extends outwardly from the outer surface of the collecting reservoir for a first predetermined distance along the flexible tubes and serves to constrain the flexible tubes.

Means are provided for securing the first and second end caps to the flexible tubes. A valving means is provided. The valving means is capable of controlling a flow of either a liquid or a gas through the passageway and is attached to a distal end of the passageway. When the flexible tubes are inserted into the receptacles of the end caps and secured thereto, a flexible pressure vessel will be formed capable of containing either a liquid or a gas at high pressure.

(2) In a variant of the invention, the means for securing the first and second end caps to the flexible tubes is selected from the group comprising: radio frequency welding, high-strength adhesive, mechanical fastening and sonic welding.

(3) In another variant of the invention, a protruding rim is provided. The protruding rim is located at the outer perimeter of the first and second end caps and upper and lower receiving notches located above and below the protruding rim. A reinforcing ring is provided. The reinforcing ring has an inner surface, an outer surface and is formed of high-strength material and is sized and shaped to fit tightly about the outer perimeter of the end cap. The reinforcing ring has an upper and lower projecting ribs and a central receiving notch located between the upper and lower projecting ribs. The projecting ribs are sized, shaped and located to fit the upper and lower receiving notches of the end cap. The central receiving notch is sized, shaped and located to fit the protruding rim of the end cap. The reinforcing ring has an aperture. The aperture extends from the inner surface to the outer surface and is sized, shaped and located to accommodate the passageway of the end cap. When the reinforcing ring is located about the outer perimeter of the first and second end caps, the pressure handling capacity of the pressure vessel is increased.

(4) In yet a further variant of the invention, a protruding rim is provided. The protruding rim is located at the outer perimeter of the first and second end caps and upper and lower receiving notches located above and below the protruding rim.

Upper and lower reinforcing rings are provided. Each of the reinforcing rings have an inner surface, an outer surface and are formed of high-strength material and are sized and shaped to fit tightly in either of the upper and lower receiving notches. At least one of the reinforcing rings has an aperture. The aperture extends from the inner surface to the outer surface and is sized, shaped and located to accommodate the passageway connecting to the collecting reservoir. When the reinforcing rings are located about the outer perimeter of the first and second end caps, the pressure handling capacity of the pressure vessel is increased.

(5) In still a further variant, means are provided for fastening the upper reinforcing ring to the lower reinforcing ring.

(6) In still a further variant of the invention, a protruding rim is provided. The protruding rim is located at the outer perimeter of the first and second end caps. At least one groove located about the outer perimeter above the protruding rim is provided. At least one groove located about the outer perimeter below the protruding rim is provided. Upper and lower reinforcing rings are provided. Each of the reinforcing rings have an inner surface, an outer surface and are formed of high-strength material and are sized and shaped to fit tightly about the outer perimeter on either side of the protruding rim. The reinforcing rings have at least one rib located upon the inner surface thereof, the rib is sized, shaped and located to engage the groove. When the reinforcing rings are located about the outer perimeter of the first and second end caps, the pressure handling capacity of the pressure vessel is increased.

(7) In another variant, means are provided for fastening the upper reinforcing ring to the lower reinforcing ring.

(8) In yet a further variant of the invention, a sintactic foam filler is provided. The foam filler is located within the collecting reservoir of at least one of the first and second end caps. The foam filler has a series of canals through it. Each of the canals connects the orifice of the receptacle to the passageway. An opening in the end cap is provided. The opening provides means for introduction of the sintactic foam into the end cap. A sealing plug is provided. The sealing plug is sized and shaped to fit sealably into the opening in the end cap. When the syntactic foam is introduced into the end cap, the pressure handling capacity of the pressure vessel is increased.

(9) In still a further variant of the invention, a sintactic foam filler is provided. The foam filler is located within the collecting reservoir of at least one of the first and second end caps. The foam filler is penetrated by a series of flexible microtubes. Each of the microtubes connects the orifice of the receptacle to the passageway. An opening in the end cap is provided. The opening provides means for introduction of the syntactic foam into the end cap. A sealing plug is provided. The sealing plug is sized and shaped to fit sealably into the opening in the end cap. When the microtubes are connected to the orifice of the receptacles in the end cap, the purity of either liquids or gasses stored in the pressure vessel is increased.

(10) In yet a further variant of the invention, an overwrapping of high-strength braiding material is provided. The braiding material extends over the flexible tubes and the first and second end caps. When the flexible pressure vessel is so overwrapped, its pressure-handling capability will be increased.

(11) In still a further variant, hoop winding of the vessel with high-strength materials is provided. The hoop winding extends over the flexible tubes and the first and second end caps. When the flexible pressure vessel is so hoop wound, its pressure-handling capability will be increased.

(12, 13) In another variant, a plastic overcoating is provided. The overcoating further increases the pressure-handling capability of the pressure vessel.

(14) In yet a further variant of the invention, a first flexible blanket is provided. The first blanket has an upper surface, a lower surface and is sized and shaped to cover the pressure vessel and extends outwardly beyond the outer edges thereof. The first blanket is fixedly attached at its lower surface to an upper surface of the pressure vessel. A second flexible blanket is provided. The second blanket has an upper surface, a lower surface and is sized and shaped to cover the pressure vessel and extends outwardly beyond the outer edges. The second blanket is fixedly attached at its upper surface to a lower surface of the pressure vessel. When the first and second flexible blankets are attached to the pressure vessel, the pressure handling capability of the pressure vessel will be increased.

(15) In another variant, heavy duty stitching is used to attach the first blanket to the second blanket. The stitching penetrates the first and second blankets and serves to further reinforce and increase the pressure-handling capabilities of the pressure vessel.

(16) In still another variant, the heavy duty stitching is high pressure hoop and lock braiding.

(17) In still a further variant of the invention, the cross-sectional shape of the outer surface of the flexible tubing is selected from the group comprising: square, triangular, round, hexagonal, ovoid, octagonal and star-shaped.

(18) In yet a further variant of the invention, the cross-sectional shape of the inner surface of the flexible tubing is selected from the group comprising: square, triangle, round, hexagonal, ovoid, octagonal, and star-shaped.

(19) In still a further variant of the invention, the cross-sectional shape of the flexible pressure vessel is selected from the group comprising: square, triangular, round, hexagonal, ovoid, octagonal, pillow-shaped, saddle-shaped, and a flattened mat shape.

(20) In yet a further variant of the invention, each of the receptacles are of a concave form selected from the group comprising: conical, dome-shaped, ellipsoid and stair-stepped.

(21) In a variant, the first and second ends of each of the flexible tubes are sized and shaped to fit sealably into the receptacles.

(22) In still a further variant of the invention, upper and lower reinforcing panels are provided. The reinforcing panels are formed of high-strength woven material and are shaped as a form to cover at least half of a surface area of the pressure vessel with extensions projecting from a perimeter of the form. The reinforcing panels are adhered to an outer surface of the pressure vessel, thereby increasing the pressure handling capability of the pressure vessel.

(23) In a variant, the method of adhesion is selected from the group comprising: high-strength adhesive, sonic welding and RF welding.

(24) In another variant, the woven material is prepregnated with either adhesive or laminating material and subjected to heat and pressure.

(25) An apparatus for fabricating a cellular reservoir flexible pressure vessel may be constructed from the following components. A raw plastic storage and feeding unit is provided. The storage and feeding unit contains a supply of raw plastic. A multi-head extruder is provided. The extruder includes a heating facility and is in communication with the feeding unit. A cooling tank is provided. The cooling tank is located downstream from the extruder. A power puller is provided. The puller serves to pull a tubing bundle from the cooling tank. Core tubing forming dies are provided. The forming dies form the tubing bundle into a predetermined shape. A binder head is provided. The binder head has an attached binder tank containing liquid binder material. A binder applicator is provided. The binder applicator comprises a secondary forming die and serves to affix the binder material to the tubing bundle. A cutting unit is provided. The cutting unit comprises a laser calibration facility and serves to cut the tubing bundle to a predetermined length. A conveyer facility is provided. The conveyer facility comprises means for positioning a cut tubing bundle. A rotating head and ram is provided. The head comprises a glue head applicator. The glue head applicator attaches to a glue tank. A plurality of preformed end caps are provided. An automated end cap loader is provided. The end cap loader positions the plurality of end caps. An automated end cap installer attached to the automated end cap loader is provided. The installer serves to attach the end caps to the tubing bundle. A high-intensity UV lamp assembly is provided. The lamp assembly serves to cure the glue.

(26) In a variant of the apparatus for fabricating a cellular reservoir flexible pressure vessel, a plurality of reinforcing rings is provided. The reinforcing rings are formed of high-strength material. A reinforcing ring auto loader is provided. A swivel ram is provided. The ram comprises of a ring loading and placement head. The swivel ram is in cooperation with the ring auto loader and serves to press the reinforcing ring onto the pressure vessel.

(27) In another variant of the apparatus for fabricating a cellular reservoir flexible pressure vessel, either a gas or liquid supply tank is provided. An auto loader test head is provided. The test head is adaptable to fittings on the end caps. A cryogenic test unit in communication with the test head is provided. The test head and the test unit provides means for pressurizing the pressure vessel.

(28) In yet a further variant of the apparatus for fabricating a cellular reservoir flexible pressure vessel, a reinforcing blanket material is provided. A glue spraying mechanism is provided. The mechanism comprises of glue tanks, glue spray heads and glue for attaching the blanket material to the pressure vessel. A blanket material feed mechanism is provided. A press forming tool is provided. The tool is adapted to form the blanket material over the cut tubing bundle and the attached end caps.

(29) In a variant, a high-strength thread is provided. A stitching head is provided. The stitching head is adapted to sew the high-strength thread through the reinforcing blanket material.

(30) In still a further variant of the apparatus for fabricating a cellular reservoir flexible pressure vessel, a high-strength braiding material is provided. A braider is provided. The braider is adapted to position and provide overwrapping of the pressure vessel with the braiding material. A binder spraying mechanism is provided. The spraying mechanism comprises of a binder tank, a binder spray head and binder material.

(31) In yet a further variant of the apparatus for fabricating a cellular reservoir flexible pressure vessel, a high-strength reinforcing ribbon is provided. An automated reinforcing ribbon winding machine is provided. The winding machine comprises of a reinforcing ribbon spool and an auto layout ribbon head. A binder spraying mechanism is provided. The spraying machine comprises of a binder tank, a binder spray head and binder material.

(32) In still a further variant of the apparatus for fabricating a cellular reservoir flexible pressure vessel, means are provided for pulling a series of high tensile strength core wires through orifices in receptacles in the end cap to a passageway in the end cap. Means are provided for injecting sintactic foam through an opening in the end cap. Means are provided for attaching a sealing plug to the opening. Means are provided for removing the core wires from the end cap. When the core wires are removed from the end cap, a series of canals will be formed in the sintactic foam connecting orifices in receptacles in the end cap to the passageway.

(33) In yet a further variant of the apparatus for fabricating a cellular reservoir flexible pressure vessel, means are provided for attaching a series of flexible microtubes to orifices in receptacles in the end cap to a passageway in the end cap. Means are provided for injecting sintactic foam through an opening in the end cap. Means are provided for attaching a sealing plug to the opening. Means are provided for removing the core wires from the end cap. When the microtubes are connected to the passageway, the pressure vessel will provide an ultra clean environment for either liquids or gasses.

(34) In still a further variant of the apparatus for fabricating a cellular reservoir flexible pressure vessel, means are provided for forming a concave receptacle having a shape selected from the group comprising: conical, dome-shaped, ellipsoid and stair-stepped.

(35) In a variant, means are provided for forming the first and second ends of each of the flexible tubes to fit sealably into the receptacles.

(36) In yet a further variant of the apparatus for fabricating a cellular reservoir flexible pressure vessel, means are provided for forming upper and lower reinforcing panels. The reinforcing panels are formed of high-strength woven material and are shaped as a form to cover at least half of a surface area of the pressure vessel with extensions projecting from a perimeter from the form. Means are provided for adhering the reinforcing panel to the outer surface of the pressure vessel, thereby increasing the pressure handling capability of the pressure vessel.

(37) In a variant of the apparatus for fabricating a cellular reservoir flexible pressure vessel, the method of adhesion is selected from the group comprising: high-strength adhesive, sonic welding and RF welding.

(38) In another variant of the apparatus for fabricating a cellular reservoir flexible pressure vessel, the woven material is prepregnated with either adhesive or laminating material and subjected to heat and pressure.

(53) In yet another variant of the invention, the cellular reservoir flexible pressure vessel, has a first pressure relief device. The first pressure relief device is located on an inner surface of either the first or second end caps and includes a reduction in thickness of the end cap at a predetermined location. When the pressure vessel is subjected to an overpressure condition, it will fail at the predetermined location.

(54) In still another variant of the invention, the first pressure relief device has an indentation in the inner surface of either the first or second end caps. The indentation has side walls angled inwardly from the inner surface.

(55) In still a further variant of the invention, the cellular reservoir flexible pressure vessel has a second pressure relief device. The second pressure relief device is located on an outer surface of the flexible pressure vessel and has at least one projecting member. The projecting member is sized and shaped to penetrate the high-strength braiding material at a predetermined location. When the high-strength braiding material is penetrated by the projecting member and the flexible pressure vessel is subjected to an overpressure condition, the vessel will fail at the predetermined location.

(56) In an additional variant, the projecting member is removably attached to the outer surface of the flexible pressure vessel.

(57) In another variant, the cellular reservoir flexible pressure vessel has a second pressure relief device. The second pressure relief device is located on an outer surface of the flexible pressure vessel and has at least one projecting member. The projecting member is sized and shaped to penetrate the high-strength material at a predetermined location. When the high-strength material is penetrated by the projecting member and the flexible pressure vessel is subjected to an overpressure condition, the vessel will fail at the predetermined location.

(58) In a further variant, the projecting member is removably attached to the outer surface of the flexible pressure vessel.

(59) In still a further variant, the cellular reservoir flexible pressure vessel has a second pressure relief device. The second pressure relief device is located on an outer surface of the flexible pressure vessel and has at least one projecting member. The projecting member is sized and shaped to penetrate either the first or second flexible blankets at a predetermined location. When either the first or second flexible blanket is penetrated by the projecting member and the flexible pressure vessel is subjected to an overpressure condition, the vessel will fail at the predetermined location.

(60) In another variant of the invention, the projecting member is removably attached to the outer surface of the flexible pressure vessel.

(61) In an additional variant of the invention, the ovoid flexible pressure vessel has a second pressure relief device. The second pressure relief device is located on the outer surface of the flexible pressure vessel and has at least one projecting member. The projecting member is sized and shaped to penetrate either the upper or lower reinforcing panels at a predetermined location. When either the upper or lower reinforcing panel is penetrated by the projecting member and the flexible pressure vessel is subjected to an overpressure condition, the vessel will fail at the predetermined location.

(62) In a further variant of the invention, the projecting member is removably attached to the outer surface of the flexible pressure vessel.

(63) In still a further variant of the invention, the cellular reservoir flexible pressure vessel has a third pressure relief device. The third pressure relief device has a weakened section of the passageway. When the flexible pressure vessel is subjected to an overpressure condition, the flexible pressure vessel will fail at the weakened section of the passageway.

(64) In another variant, the weakened section of the passageway has a smaller cross-sectional area than a balance of the passageway.

(65) In an additional variant, the cellular reservoir flexible pressure vessel has high-strength braiding material wound about the passageway, thereby providing additional resistance to pressure for the flexible pressure vessel.

(66) In a further variant, the cellular reservoir flexible pressure vessel has a fourth pressure relief device. The fourth pressure relief device has either a weakening or an absence of high-strength braiding material at a predetermined location along the passageway. When the flexible pressure vessel is subjected to an overpressure condition, the flexible pressure vessel will fail at the predetermined location along the passageway.

(67) In still a further variant, the cellular reservoir flexible pressure vessel has hoop winding about the passageway, thereby providing additional resistance to pressure to the flexible pressure vessel.

(68) In another variant of the invention, the cellular reservoir flexible pressure vessel has a fifth pressure relief device. The fifth pressure relief device has either a weakening or an absence of hoop winding at a predetermined location along the passageway. When the flexible pressure vessel is subjected to an overpressure condition, the pressure vessel will fail at the predetermined location along the passageway.

(69) In an additional variant, the cellular reservoir flexible pressure vessel has either a weakening or a spreading of fibers in the high-strength braiding material at a predetermined location. The predetermined location is above an outer surface of the pressure vessel. When the high-strength braiding material has the fibers weakened or spread in the predetermined location and the pressure vessel is subjected to an overpressure condition, the pressure vessel will fail at the predetermined location.

(70) In a further variant, the cellular reservoir flexible pressure vessel has either a weakening or a spreading of fibers in the high-strength material at a predetermined location. The predetermined location is above an outer surface of the pressure vessel. When the high-strength material has the fibers weakened or spread in the predetermined location and the pressure vessel is subjected to an overpressure condition, the pressure vessel will fail at the predetermined location.

(71) In still a further variant, the cellular reservoir flexible pressure vessel has either a weakening or a spreading of fibers in either of the first flexible blanket and the second flexible blanket at a predetermined location. The predetermined location is above an outer surface of the pressure vessel. When either of the first flexible blanket and the second flexible blanket has the fibers weakened or spread in the predetermined location and the pressure vessel is subjected to an overpressure condition, the pressure vessel will fail at the predetermined location.

(72) In another variant of the invention, the cellular reservoir flexible pressure vessel has either a weakening or a spreading of fibers in either the upper or lower reinforcing panels at a predetermined location. The predetermined location is above the outer surface of the pressure vessel. When either of the upper or lower reinforcing panels has the fibers weakened or spread in the predetermined location and the pressure vessel is subjected to an overpressure condition, the pressure vessel will fail at the predetermined location.

(73) In an additional variant, the connection to either a passageway of another vessel or a valve further has a capillary tube. The capillary tube has a proximate end and a distal end and is formed of resilient material and sized and shaped to fit slidably within the passageway. High-strength braiding material is provided. The braiding material is located about the capillary tube and extends along the capillary tube to within a first predetermined distance from the proximate end. The proximate end of the braiding covered capillary tube is inserted into the passageway and is either radio frequency welded or secured with adhesive to it. When the proximate end of the capillary tube is either welded or secured with adhesive within the passageway, it will be permanently attached to it.

(74) In a further variant of the invention, an apparatus for modifying reinforcing panel material is provided. The apparatus has means for supporting a supply roll of flexible blanket material. Means for moving the flexible blanket material from the supply roll to a work area is provided. Means for tensioning the flexible blanket material in the work area is also provided. At least one separating member, which is sized and shaped to penetrate and separate fibers of the flexible blanket material is further provided.

Also provided is a means for moving the separating member into the tensioned flexible blanket material at a predetermined location in the material, thereby either weakening and separating the fibers. Means for retracting the separating member from the tensioned flexible blanket material is provided. Means for moving the flexible blanket material from work area to a storage area is provided. The flexible blanket material will have either a weakened or separated fibers in the predetermined location prior to application to the pressure vessel.

(75) In still a further variant of the invention, an apparatus for modifying reinforcing panel material is provided. The apparatus has means for supporting a supply roll of reinforcing panel material. Means for moving the reinforcing panel material from the supply roll to a work area is provided. Means for tensioning the reinforcing panel material in the work area is provided. At least one separating member is provided. The separating member is sized and shaped to penetrate and separate fibers of the reinforcing panel material. Also provided are means for moving the separating member into the tensioned reinforcing panel material at a predetermined location in the material, thereby either weakening or separating the fibers. Means for retracting the separating member from the tensioned reinforcing panel material is provided. Means for moving the reinforcing panel material from work area to a storage area is provided. The reinforcing panel material will have either weakened or separated fibers in the predetermined location prior to application to the pressure vessel.

(76) In another variant, a method for making the cellular reservoir flexible pressure vessel is provided. The method has the following steps: providing a supply roll of flexible blanket material; supporting the supply roll; moving the flexible blanket material from the supply roll to a work area; tensioning the flexible blanket material in the work area; providing at least one separating member, where the member is sized and shaped to penetrate and separate fibers of the flexible blanket material; moving the separating member into the tensioned flexible blanket material at a predetermined location in the material, thereby either weakening or separating the fibers; retracting the separating member from the tensioned flexible blanket material; moving the flexible blanket material from work area to a storage area. The flexible blanket material will have either weakened or separated fibers in the predetermined location prior to application to the pressure vessel.

(77) In a final variant, a method for making the cellular reservoir flexible pressure vessel has the following steps: providing a supply roll of reinforcing panel material; providing means for supporting the supply roll; moving the reinforcing panel material from the supply roll to a work area; tensioning the reinforcing panel material in the work area; providing at least one separating member, where the member is sized and shaped to penetrate and separate fibers of the reinforcing panel material; moving the separating member into the tensioned reinforcing panel material at a predetermined location in the material, thereby either weakening or separating the fibers; retracting the separating member from the tensioned reinforcing panel material; moving the reinforcing panel material from work area to a storage area. The reinforcing panel material will have either weakened or separated fibers in the predetermined location prior to application to the pressure vessel.

DESCRIPTION OF THE DRAWINGS

FIG. 3 is an end view of the FIG. 1 embodiment taken along the line 3—3 illustrating a first embodiment of a reinforcing ring, an aperture in the ring and a cross-section of the ring in partial cutaway;

FIG. 3A is a side elevational view of the FIG. 1 embodiment, illustrating a first embodiment of upper and lower reinforcing rings;

FIG. 4 is a partial cross-sectional view of the FIG. 3A embodiment taken along the line 4—4;

FIG. 5 is a partial cross-sectional view of the FIG. 3A embodiment illustrating a means for fastening the upper and lower reinforcing rings together;

FIG. 43 is a cross-sectional view of an embodiment illustrating a third pressure relief device with a weakened section of the passageway;

FIG. 44 is a partial detailed view of the FIG. 43 embodiment taken along the line 44—44 illustrating the third pressure relief device;

FIG. 47 is a plan view of the FIG. 33 embodiment illustrating the weakening or spreading of fibers in the flexible blanket at predetermined location;

FIG. 48 is a cross-sectional view of the FIG. 47 embodiment illustrating the a weakening or spreading of fibers in the flexible blanket at predetermined location;

Figure 1:
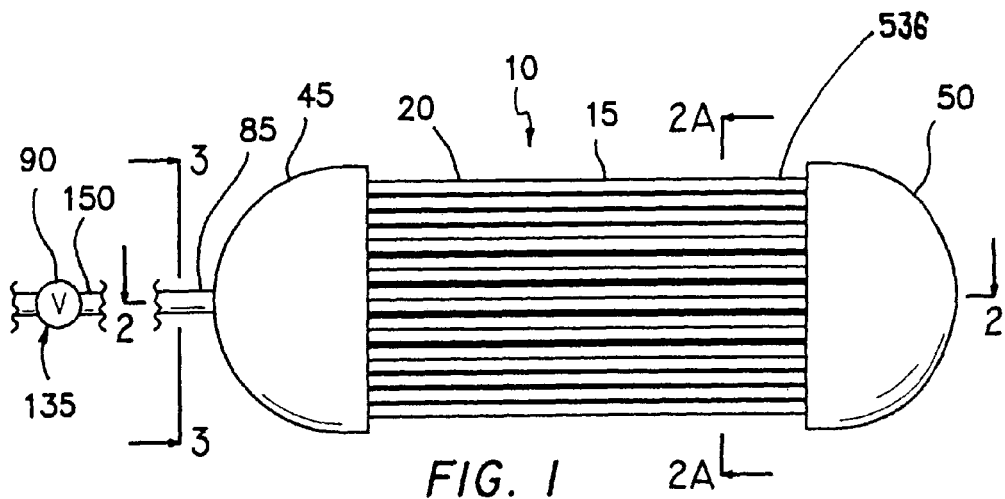
FIG. 1 is a plan view of a first embodiment of the invention illustrating cellular reservoir cells, first and second end caps, a connecting passageways and a valve.
Figure 2:
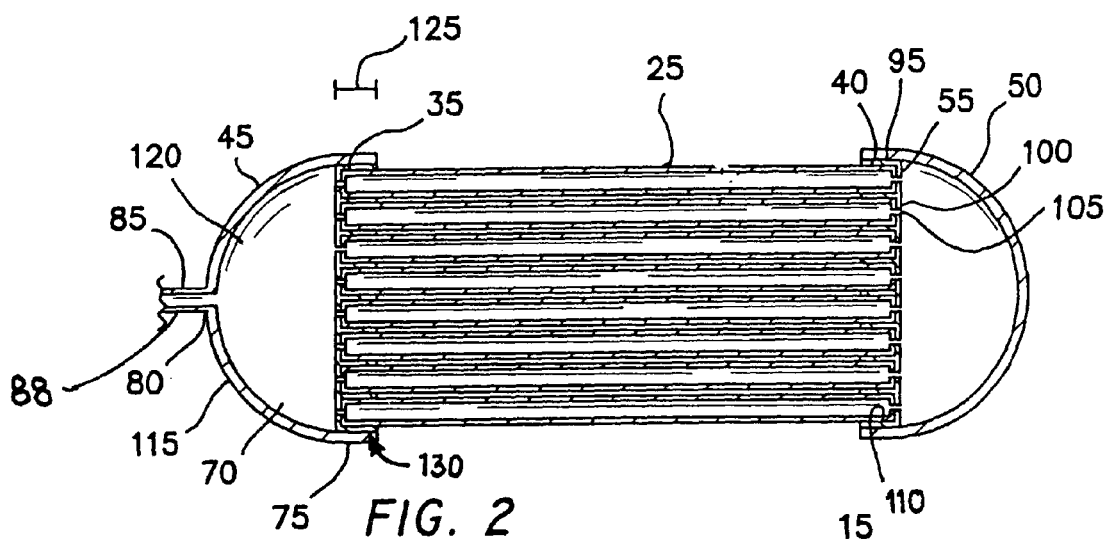
FIG. 2 is a cross-sectional view of the FIG. 1 embodiment taken along the line 22.
Figure 2A:
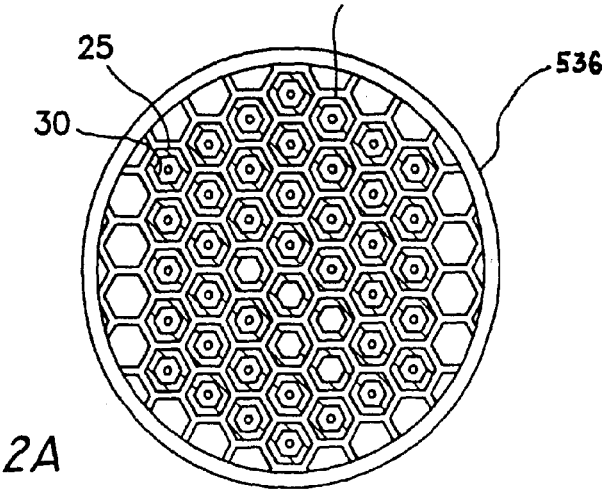
FIG. 2A is an end cross-sectional view of the FIG. 1 embodiment taken along the line 2A—2A.

DETAILED DESCRIPTION OF THE PREFERRED EMBODIMENT (1) A cellular reservoir flexible pressure vessel 10 providing the desired features, as shown in FIGS. 1, 2 and 2A, may be constructed from the following components. A plurality of flexible tubes 15 is provided. Each of the flexible tubes 15 are formed of resilient material 20 and has an outer surface 25, an inner surface 30, a first end 35 and a second end 40.

First 45 and second 50 end caps are provided. Each of the end caps 45, 50 has a receptacle 55 for either of the first 35 or second 40 ends of each of the flexible tubes 15, a collecting reservoir 70, a surrounding outer rim 75 and an outer perimeter 80 perpendicular to the surrounding outer rim 75. At least one of the first 45 and second 50 end caps has a passageway 85 connecting to the collecting reservoir 70 as a connection 88 to either a passageway 85 of another pressure vessel 10 or a valve 90. Each of the receptacles 55 has a surrounding wall 95, a base 100 and an orifice 105 penetrating the base 100. The orifice 105 connects the receptacle 55 to either the collecting reservoir 70 or the passageway 85. The wall 95 has an interior surface 110. The interior surface 110 is sized and shaped to fit frictionally over the outer surface 25 of one of the flexible tubes 15 at either the first 35 or second 40 ends. The collecting reservoir 70 has an outer surface 115 and connects the base 100 of each of the receptacles 55 to a common space 120. The common space 120 is either closed or connected to the passageway 85. The surrounding outer rim 75 extends outwardly from the outer surface 115 of the collecting reservoir 70 for a first predetermined distance 125 along the flexible tubes 15 and serves to constrain the flexible tubes 15.

Means 130 are provided for securing the first 45 and second 50 end caps to the flexible tubes 15. A valving means 135 is provided. The valving means 135 is capable of controlling a flow of either a liquid or a gas through the passageway 85 and is attached to a distal end 150 of the passageway 85. When the flexible tubes 15 are inserted into the receptacles 55 of the end caps 45, 50 and secured thereto, a flexible pressure vessel 10 will be formed capable of containing either a liquid or a gas at high pressure.

(2) In a variant of the invention, as shown in FIGS. 1–2, the means 130 for securing the first 45 and second 50 end caps to the flexible tubes 15 is selected from the group comprising: radio frequency welding, high-strength adhesive, mechanical fastening and sonic welding.

(3) In another variant of the invention, as shown in FIG. 3, a protruding rim 180 is provided. The protruding rim 180 is located at the outer perimeter 80 of the first 45 and second 50 end caps and upper 185 and lower 190 receiving notches located above and below the protruding rim 180. A reinforcing ring 195 is provided. The reinforcing ring 195 has an inner surface 200, an outer surface 205 and is formed of high-strength material 206. The reinforcing ring 195 is sized and shaped to fit tightly about the outer perimeter 80 of the end caps 45, 50. The reinforcing ring 195 has an upper 210 and lower 215 projecting ribs and a central receiving notch 220 located between the upper 210 and lower 215 projecting ribs. The projecting ribs 210, 215 are sized, shaped and located to fit the upper 185 and lower 190 receiving notches of the end caps 45, 50. The central receiving notch 220 is sized, shaped and located to fit the protruding rim 180 of the end caps 45, 50. The reinforcing ring 195 has an aperture 225. The aperture 225 extends from the inner surface 200 to the outer surface 205 and is sized, shaped and located to accommodate the passageway 85 of the end caps 45, 50. When the reinforcing ring 195 is located about the outer perimeter 80 of the first 45 and second 50 end caps, the pressure handling capacity of the pressure vessel 10 is increased.

(4) In yet a further variant of the invention, as shown in FIG. 3A and FIG. 4, a protruding rim 180 is provided. The protruding rim 180 is located at the outer perimeter 80 of the first 45 and second 50 end caps. Upper 185 and lower 190 receiving notches are provided. The upper 185 and lower 190 receiving notches are located above and below the protruding rim 180.

Upper 230 and lower 235 reinforcing rings are provided. Each of the reinforcing rings 230, 235 has an inner surface 240, an outer surface 245 and is formed of high-strength material 246. The upper 230 and lower 235 reinforcing rings are sized and shaped to fit tightly in either of the upper 185 and lower 190 receiving notches. At least one of the reinforcing rings 230, 235 has an aperture 250. The aperture 250 extends from the inner surface 240 to the outer surface 245 and is sized, shaped and located to accommodate the passageway 85 connecting to the collecting reservoir 70. When the reinforcing rings 230, 235 are located about the outer perimeter 80 of the first 45 and second 50 end caps, the pressure handling capacity of the pressure vessel 10 is increased.

(5) In another variant of the invention, as shown in FIG. 5, means 255 are provided for fastening the upper reinforcing ring 230 to the lower reinforcing ring 235.

Figure 6:
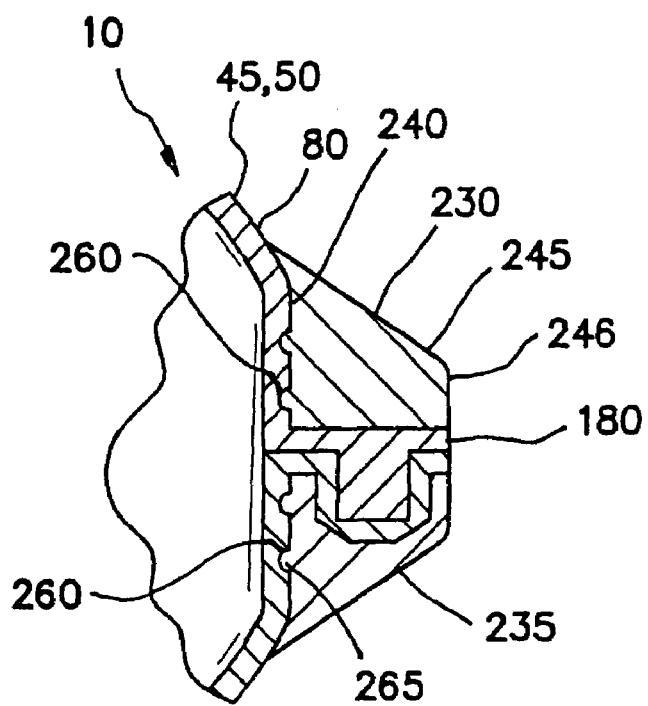
FIG. 6 is a partial cross-sectional view of a second embodiment of upper and lower reinforcing rings illustrating grooves and ribs for attaching the rings.

(6) In still a further variant of the invention, as shown in FIG. 6, a protruding rim 180 is provided. The protruding rim 180 is located at the outer perimeter 80 of the first 45 and second 50 end caps. At least one groove 260 located about the outer perimeter 80 above the protruding rim 180 is provided. At least one groove 260 located about the outer perimeter 80 below the protruding rim 180 is provided. Upper 230 and lower 235 reinforcing rings are provided. Each of the reinforcing rings 230, 235 has an inner surface 240, an outer surface 245 and is formed of high-strength material 246. Each of the upper 230 and lower 235 reinforcing rings is sized and shaped to fit tightly about the outer perimeter 80 on either side of the protruding rim 180. Each of the reinforcing rings 230, 235 has at least one rib 265 located upon the inner surface 240 thereof. The rib 265 is sized, shaped and located to engage the groove 260. When the reinforcing rings 230, 235 are located about the outer perimeter 80 of the first 45 and second 50 end caps, the pressure handling capacity of the pressure vessel 10 is increased.

Figure 7:
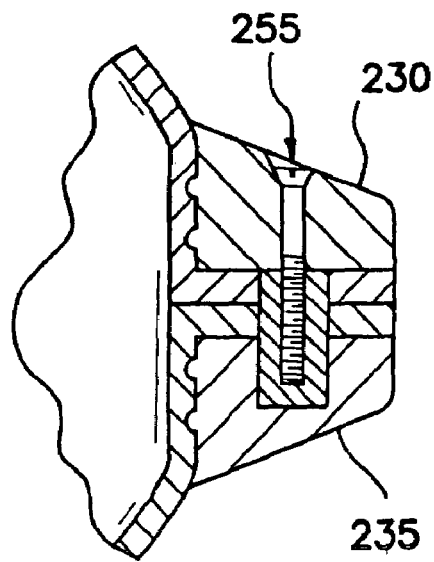
FIG. 7 is a partial cross-sectional view of a third embodiment of upper and lower reinforcing rings illustrating grooves and ribs for attaching the rings and means for attaching the rings together.

(7) In another variant of the invention, as shown in FIG. 7, means 255 are provided for fastening the upper reinforcing ring 230 to the lower reinforcing ring 235.

Figure 8:
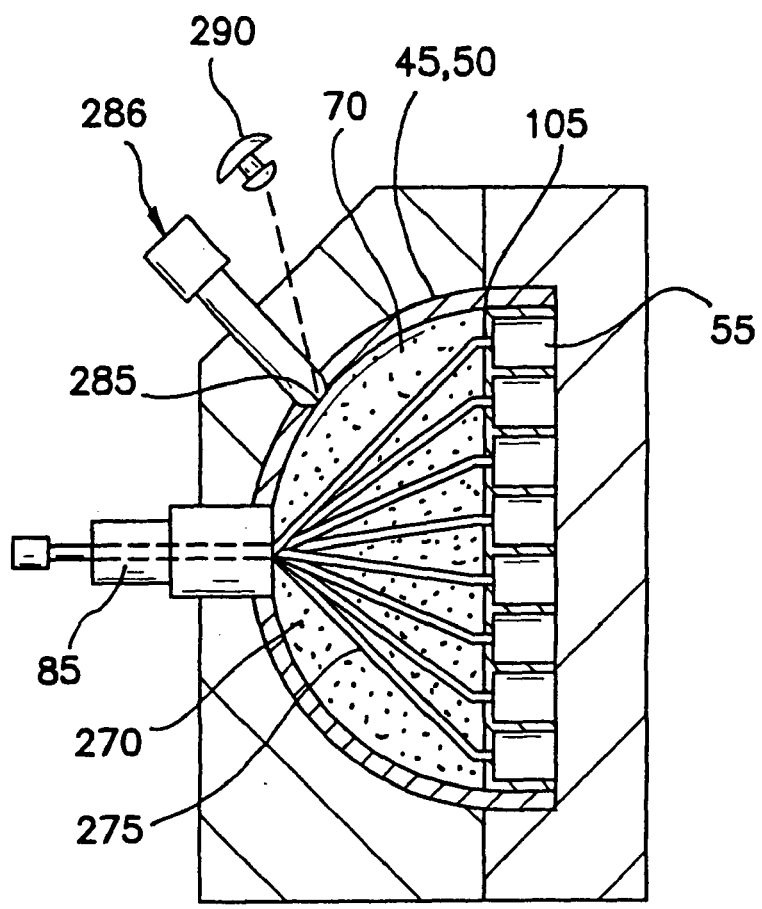
FIG. 8 is a cross-sectional view of an end cap illustrating means for introducing sintactic foam into the end cap and wires for forming canals through the foam.

(8) In yet a further variant of the invention, as shown in FIG. 8, a sintactic foam filler 270 is provided. The foam filler 270 is located within the collecting reservoir 70 of at least one of the first 45 and second 50 end caps. The foam filler 270 has a series of canals 275 through it. Each of the canals 275 connects the orifice 105 of the receptacle 55 to the passageway 85. An opening 285 in the end caps 45, 50 is provided. The opening 285 provides means 286 for introduction of the foam filler 270 into the end caps 45, 50. A sealing plug 290 is provided. The sealing plug 290 is sized and shaped to fit sealably into the opening 285 in the end caps 45, 50. When the foam filler 270 is introduced into the end caps 45, 50, the pressure handling capacity of the pressure vessel 10 is increased.

Figure 9:
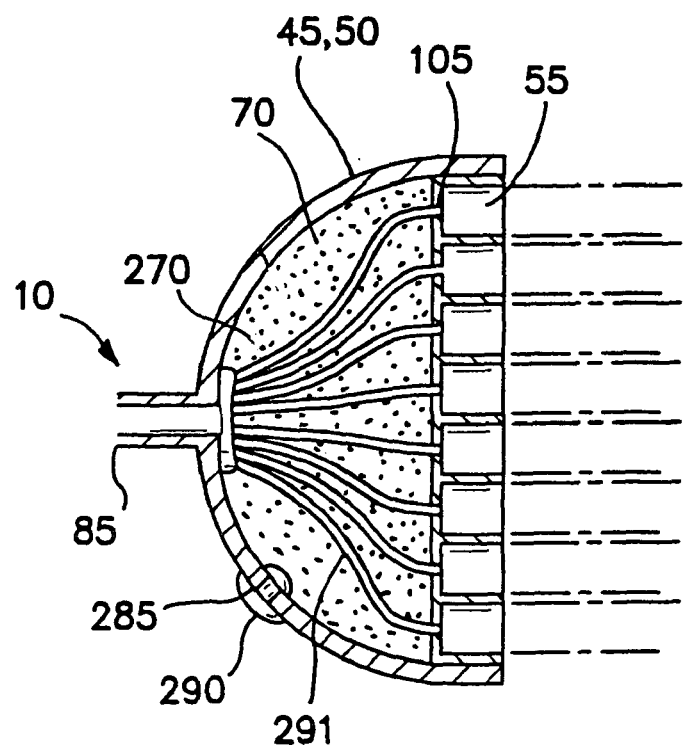
FIG. 9 is a cross-sectional view of an end cap illustrating microtubes connecting the receptacles to the passageway and a sealing plug for closing the end cap after introduction of the syntactic foam.

(9) In still a further variant of the invention, as shown in FIG. 9, a sintactic foam filler 270 is provided. The foam filler 270 is located within the collecting reservoir 70 of at least one of the first 45 and second 50 end caps. The foam filler 270 is penetrated by a series of flexible microtubes 291. Each of the microtubes 291 connects the orifice 105 of the receptacle 55 to the passageway 85. An opening 285 in the end caps 45, 50 is provided. The opening 285 provides means 286 for introduction of the sintactic foam 270 into the end caps 45, 50. A sealing plug 290 is provided. The sealing plug 290 is sized and shaped to fit sealably into the opening 285 in the end caps 45, 50. When the microtubes 291 are connected to the orifices 105 of the receptacles 55 in the end caps 45, 50, the purity of either liquids or gasses stored in the pressure vessel 10 is increased.

Figure 10:
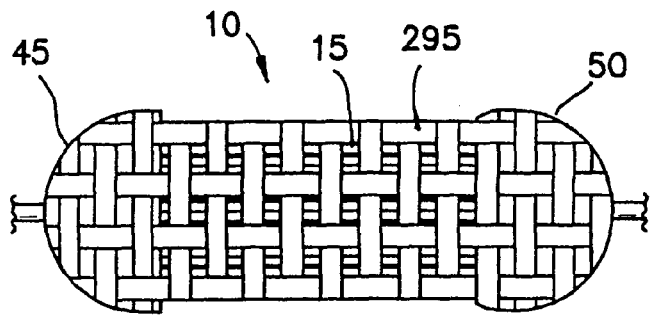
FIG. 10 is a side elevational view of the FIG. 1 embodiment illustrating an overwrapping of high-strength braiding material.

(10) In yet a further variant of the invention, as shown in FIG. 10, an overwrapping of high-strength braiding material 295 is provided. The braiding material 295 extends over the flexible tubes 15 and the first 45 and second 50 end caps. When the flexible pressure vessel 10 is so overwrapped, its pressure-handling capability will be increased.

Figure 11:
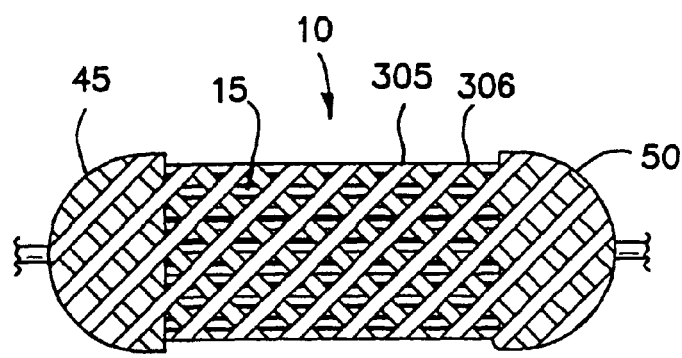
FIG. 11 is a side elevational view of the FIG. 1 embodiment illustrating hoop winding.

(11) In still a further variant of the invention, as shown in FIG. 11, a hoop winding 305 with high-strength materials 306 is provided. The hoop winding 305 extends over the flexible tubes 15 and the first 45 and second 50 end caps. When the flexible pressure vessel 10 is so hoop wound, its pressure-handling capability will be increased.

Figure 12:
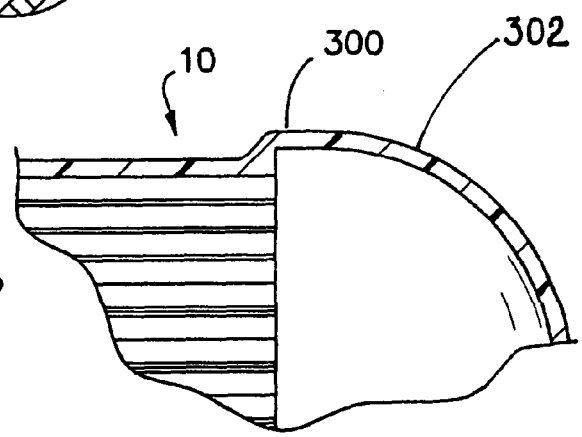
FIG. 12 is a partial cross-sectional view of the FIG. 1 embodiment illustrating a plastic overcoating.

(12) In another variant, as shown in FIG. 12, a plastic overcoating 300 is provided.

The overcoating 300 further increases the pressure-handling capability of the pressure vessel 10.

(13) In another variant, as shown in FIG. 12, a plastic overcoating 302 is provided. The overcoating 302 further increases the pressure-handling capability of the pressure vessel 10.

Figure 13:
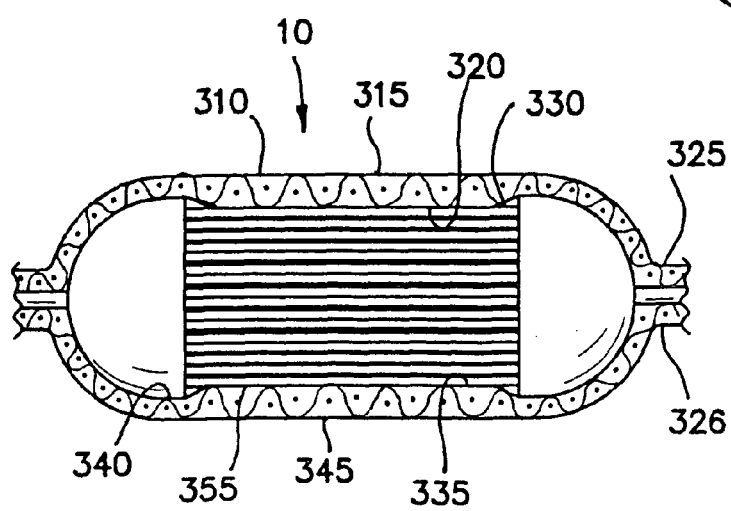
FIG. 13 cross-sectional view of the FIG. 1 embodiment illustrating flexible blankets attached to the pressure vessel.

(14) In yet a further variant of the invention, as shown in FIG. 13, a first flexible blanket 310 is provided. The first blanket 310 has an upper surface 315, a lower surface 320 and is sized and shaped to cover the pressure vessel 10. The first flexible blanket 310 extends outwardly beyond the outer edges 325 thereof. The first blanket 310 is fixedly attached at its lower surface 320 to an upper surface 330 of the pressure vessel 10. A second flexible blanket 335 is provided. The second blanket 335 has an upper surface 340, a lower surface 345 and is sized and shaped to cover the pressure vessel 10. The second flexible blanket 335 extends outwardly beyond the outer edges 326 thereof. The second blanket 335 is fixedly attached at its upper surface 340 to a lower surface 355 of the pressure vessel 10. When the first 310 and second 335 flexible blankets are attached to the pressure vessel 10, the pressure handling capability of the pressure vessel 10 will be increased.

Figure 14:
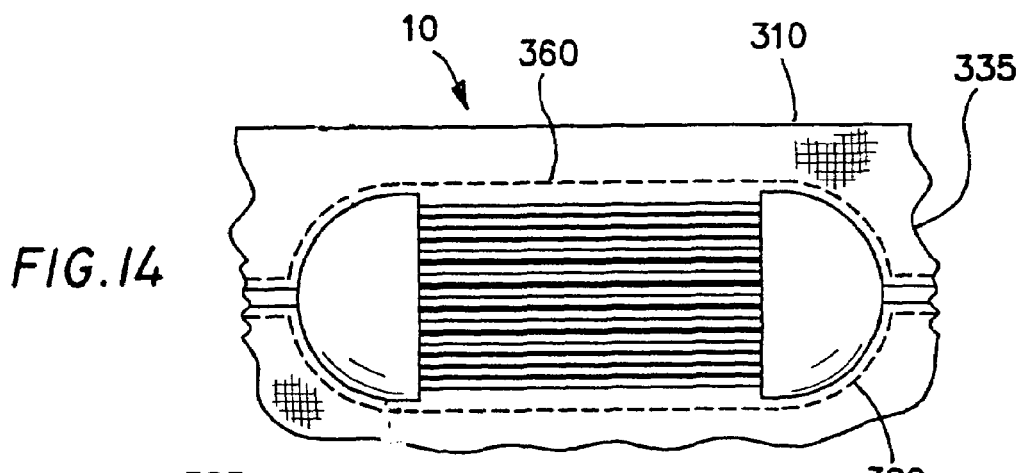
FIG. 14 is a plan view of the FIG. 1 embodiment illustrating high-strength stitching of the flexible blankets.
Figure 15A:
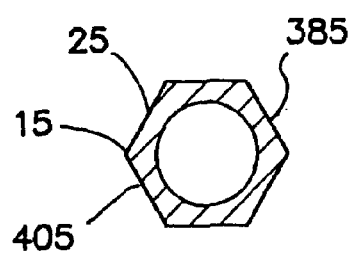
FIG. 15A is a cross-sectional view of a cellular reservoir tube having a hexagonal external cross-section.
Figure 15B:
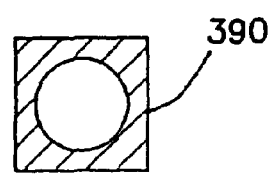
FIG. 15B is a cross-sectional view of a cellular reservoir tube having a square external cross-section.
Figure 15C:
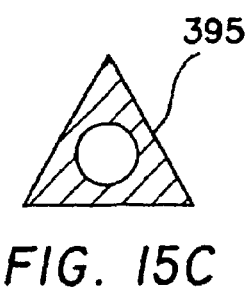
FIG. 15C is a cross-sectional view of a cellular reservoir tube having a equilateral triangular external cross-section.
Figure 15D:
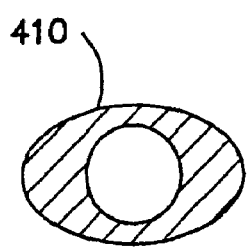
FIG. 15D is a cross-sectional view of a cellular reservoir tube having an oval external cross-section.
Figure 15E:
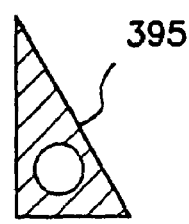
FIG. 15E is a cross-sectional view of a cellular reservoir tube having a right triangular external cross-section.
Figure 15F:
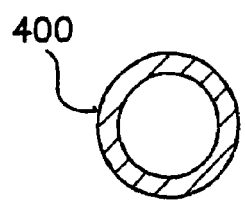
FIG. 15F is a cross-sectional view of a cellular reservoir tube having a round external cross-section.
Figure 15G:
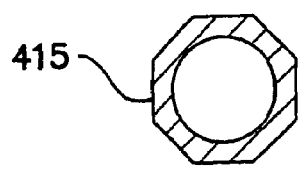
FIG. 15G is a cross-sectional view of a cellular reservoir tube having a octagonal external cross-section.
Figure 15H:
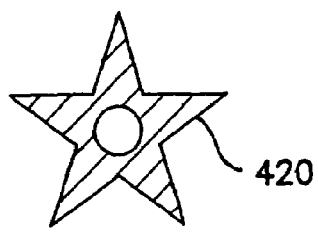
FIG. 15H is a cross-sectional view of a cellular reservoir tube having a star-shaped external cross-section.
Figure 16A:
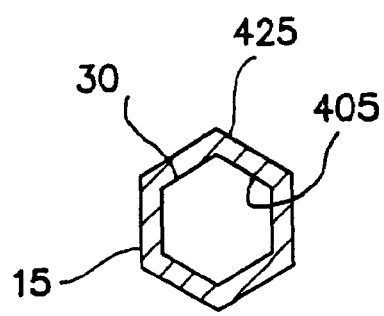
FIG. 16A is a cross-sectional view of a cellular reservoir tube having a hexagonal internal cross-section.
Figure 16B:
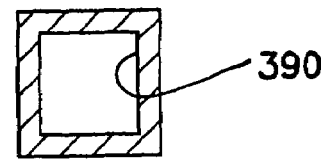
FIG. 16B is a cross-sectional view of a cellular reservoir tube having a square internal cross-section.
Figure 16C:
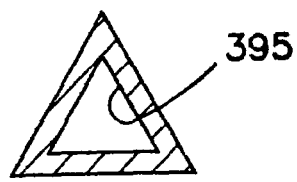
FIG. 16C is a cross-sectional view of a cellular reservoir tube having a equilateral tringular internal cross-section.
Figure 16D:
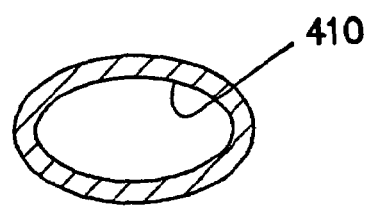
FIG. 16D is a cross-sectional view of a cellular reservoir tube having an oval internal cross-section.
Figure 16E:
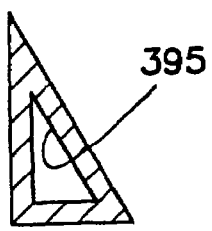
FIG. 16E is a cross-sectional view of a cellular reservoir tube having a right triangular internal cross-section.
Figure 16F:
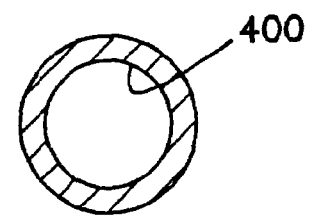
FIG. 16F is a cross-sectional view of a cellular reservoir tube having a round internal cross-section.
Figure 16G:
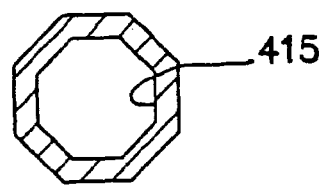
FIG. 16G is a cross-sectional view of a cellular reservoir tube having a octagonal internal cross-section.
Figure 16H:
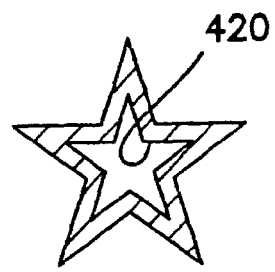
FIG. 16H is a cross-sectional view of a cellular reservoir tube having a star-shaped internal cross-section.
Figure 17A:
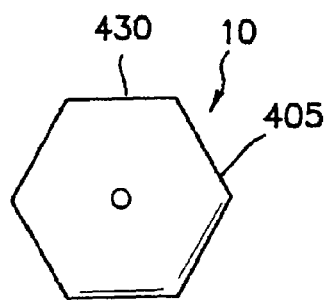
FIG. 17A is a cross-sectional view of a cellular reservoir flexible pressure vessel having a hexagonal shape.
Figure 17B:
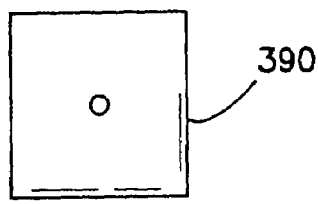
FIG. 17B is a cross-sectional view of a cellular reservoir flexible pressure vessel having a square shape.
Figure 17C:
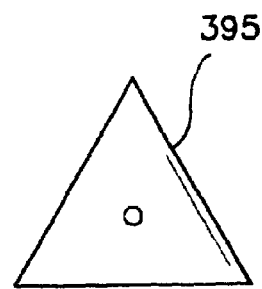
FIG. 17C is a cross-sectional view of a cellular reservoir flexible pressure vessel having an equilateral triangular shape.
Figure 17D:
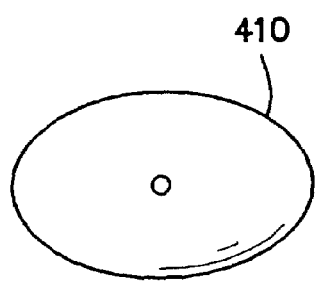
FIG. 17D is a cross-sectional view of a cellular reservoir flexible pressure vessel having an oval shape.
Figure 17E:
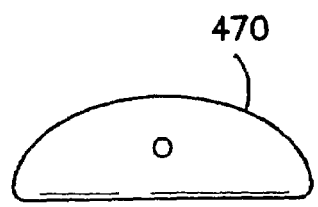
FIG. 17E is a cross-sectional view of a cellular reservoir flexible pressure vessel having an airfoil shape.
Figure 17F:
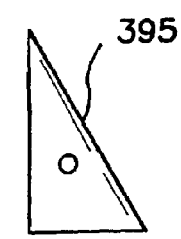
FIG. 17F is a cross-sectional view of a cellular reservoir flexible pressure vessel having a right triangular shape.
Figure 17G:
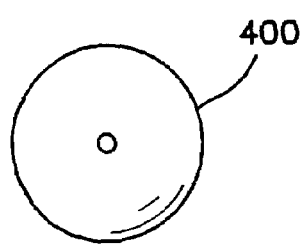
FIG. 17G is a cross-sectional view of a cellular reservoir flexible pressure vessel having a round shape.
Figure 17H:
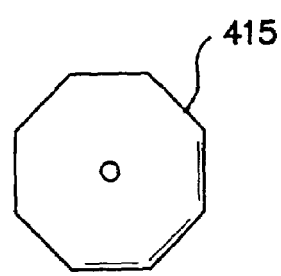
FIG. 17H is a cross-sectional view of a cellular reservoir flexible pressure vessel having a octagonal shape.
Figure 17I:
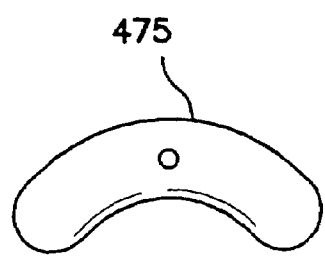
FIG. 17I is a cross-sectional view of a cellular reservoir flexible pressure vessel having a saddle shape.
Figure 17J:
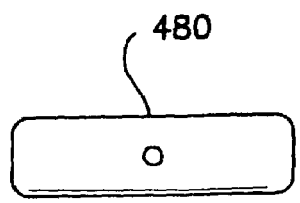
FIG. 17J is a cross-sectional view of a cellular reservoir flexible pressure vessel having a flat mat shape.
Figure 18A:
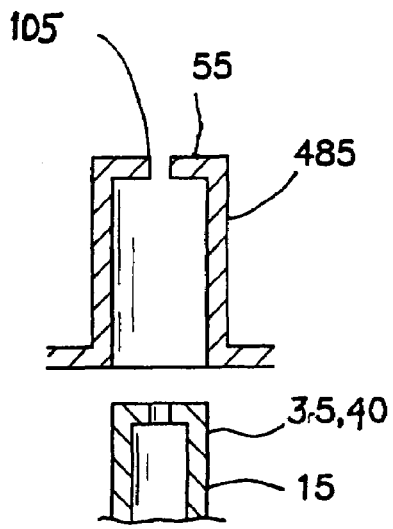
FIG. 18A is a cross-sectional view of a receptacle and fitting square-shaped flexible tube end.
Figure 18B:
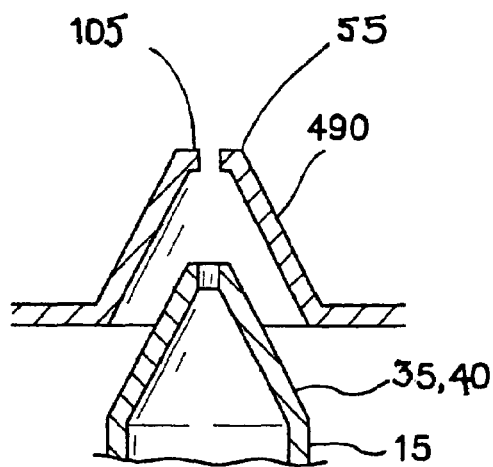
FIG. 18B is a cross-sectional view of a receptacle and fitting cone-shaped flexible tube end.
Figure 18C:
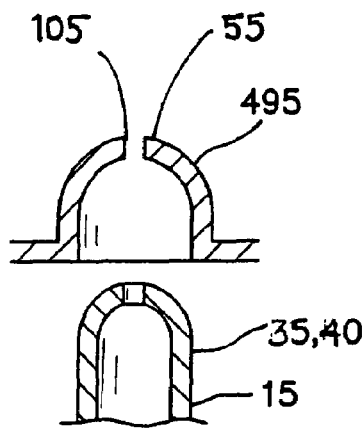
FIG. 18C is a cross-sectional view of a receptacle and fitting hemi-spherical-shaped flexible tube end.
Figure 18D:
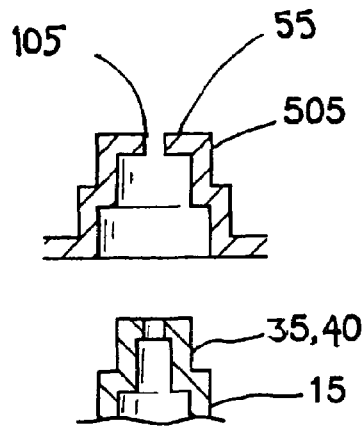
FIG. 18D is a cross-sectional view of a receptacle and fitting step-shaped flexible tube end.
Figure 18E:
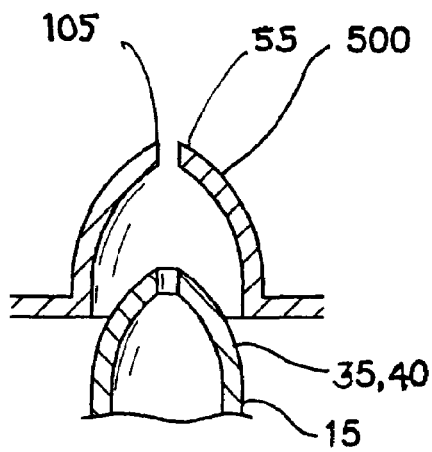
FIG. 18E is a cross-sectional view of a receptacle and fitting bullet-shaped flexible tube end.

(15) In another variant, as shown in FIG. 14, heavy duty stitching 360 is used to attach the first blanket 310 to the second 335 blanket. The stitching 360 penetrates the first 310 and second blanket 335 and serves to further reinforce and increase the pressure-handling capabilities of the pressure vessel 10.

(16) In still another variant, as shown in FIG. 14, the heavy duty stitching 360 is high pressure hoop and lock braiding 380.

(17) In still a further variant of the invention, as shown in FIG. 15A, FIG. 15B, FIG. 15C, FIG. 15D, FIG. 15E, FIG. 15F, FIG. 15G and FIG. 15H, the cross-sectional shape 385 of the outer surface 25 of the flexible tubing 15 is selected from the group comprising: square 390, triangular 395, round 400, hexagonal 405, ovoid 410, octagonal 415 and star-shaped 420.

(18) In yet a further variant of the invention, as shown in FIG. 16A, FIG. 16B, FIG. 16C, FIG. 16D, FIG. 16E, FIG. 16F, FIG. 16G and FIG. 16H, the cross-sectional shape 425 of the inner surface 30 of the flexible tubing 15 is selected from the group comprising: square 390, triangle 395, round 400, hexagonal 405, ovoid 410, octagonal 415, and star-shaped 420.

(19) In still a further variant of the invention, as shown in FIG. 17A, FIG. 17B, FIG. 17C, FIG. 17D, FIG. 17E, FIG. 17F, FIG. 17G, FIG. 17H, FIG. 17I and FIG. 17J, the cross-sectional shape 430 of the flexible pressure vessel 10 is selected from the group comprising: square 390, triangular 395, round 400, hexagonal 405, ovoid 410, octagonal 415, pillow-shaped 470, saddle-shaped 475, and a flattened mat shape 480.

(20) In yet a further variant of the invention, as shown in FIG. 18A, FIG. 18B, FIG. 18C, FIG. 18D and FIG. 18E, each of the receptacles 55 are of a concave form 485 selected from the group comprising: conical 490, dome-shaped 495, ellipsoid 500 and stair-stepped 505.

(21) In a variant, as shown in FIG. 18A, FIG. 18B, FIG. 18C, FIG. 18D and FIG. 18E, the first 35 and second 40 ends of each of the flexible tubes 15 are sized and shaped to fit sealably into the receptacles 55.

Figure 19:
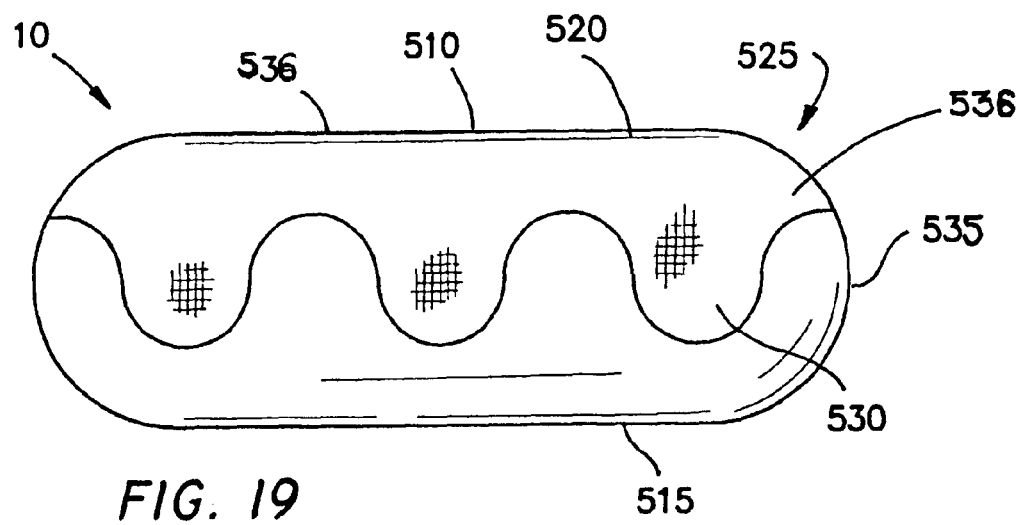
FIG. 19 is a side elevational view of the FIG. 1 embodiment enclosed in upper and lower reinforcing panels.
Figure 20:
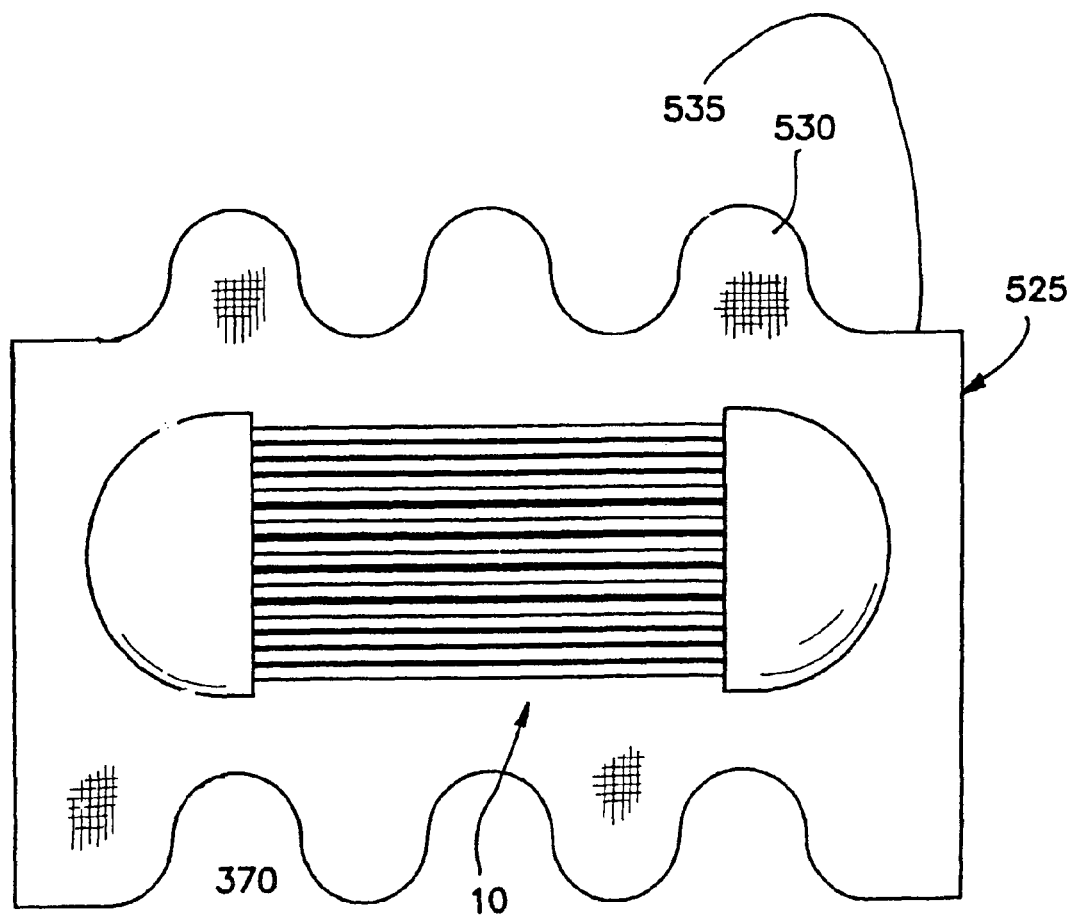
FIG. 20 is a plan view of the FIG. 1 embodiment on upper and lower reinforcing panels prior to attachment.

(22) In still a further variant of the invention, as shown in FIG. 19 and FIG. 20, upper 510 and lower 515 reinforcing panels are provided. The reinforcing panels 510, 515 are formed of high-strength woven material 520 and are shaped as a form 525 to cover at least half of a surface area 526 of the pressure vessel 10 with extensions 530 projecting from a perimeter 535 of the form 525. The reinforcing panels 510, 515 are joined to the outer surface 536 of the pressure vessel 10, thereby increasing the pressure handling capability of the pressure vessel 10.

(23) In a variant, the method of adhesion is selected from the group comprising: high-strength adhesive, sonic welding and RF welding.

(24) In another variant, as shown in FIG. 20, the woven material 520 is prepregnated with either adhesive or laminating material and subjected to heat and pressure.

Figure 21:
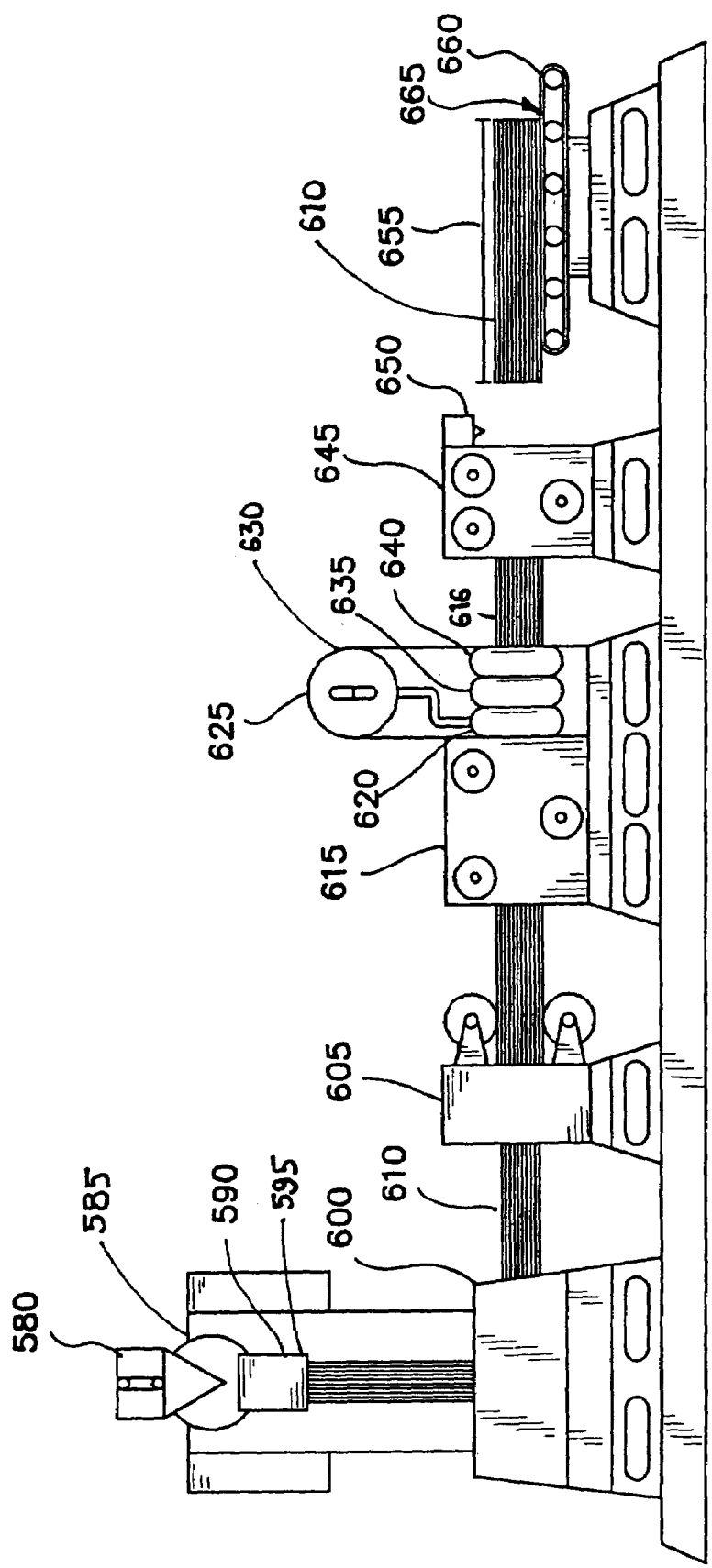
FIG. 21 is a side elevational view of an apparatus for fabricating flexible tubes for a cellular reservoir flexible pressure vessel.
Figure 22:
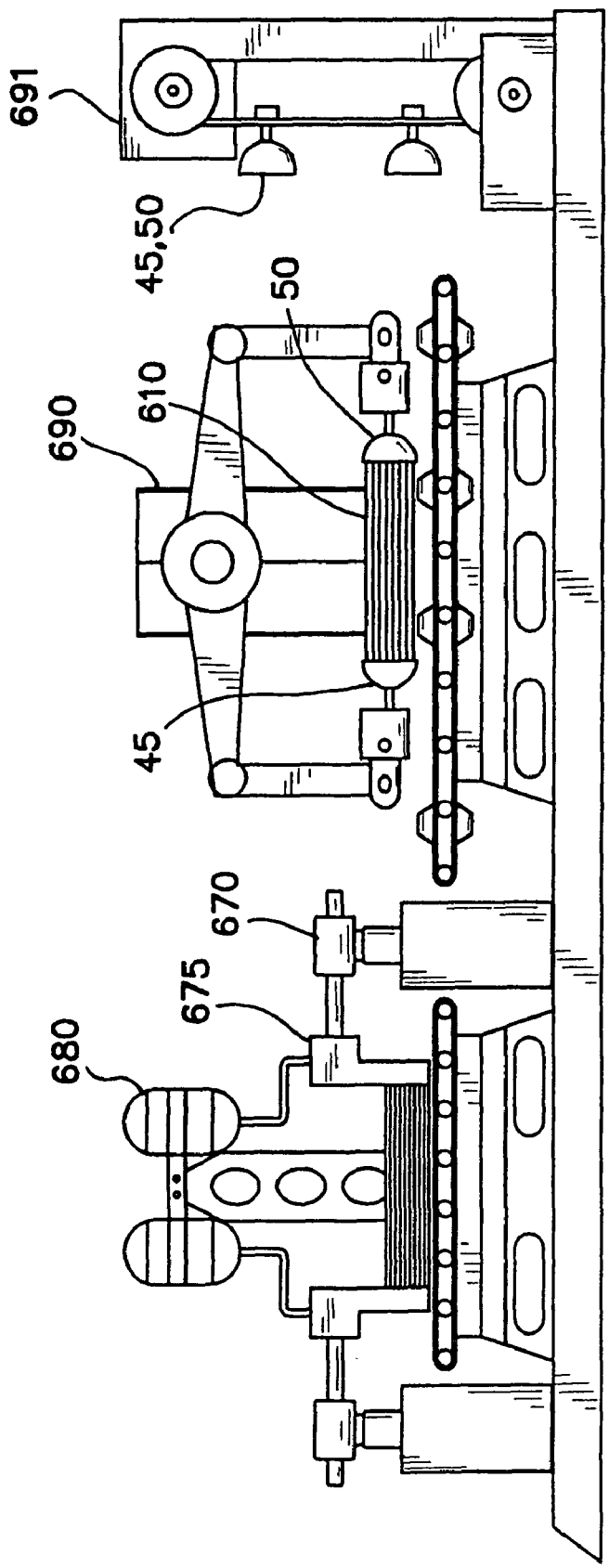
FIG. 22 is a side elevational view of an apparatus for attaching the end caps to the flexible tubes.
Figure 23:
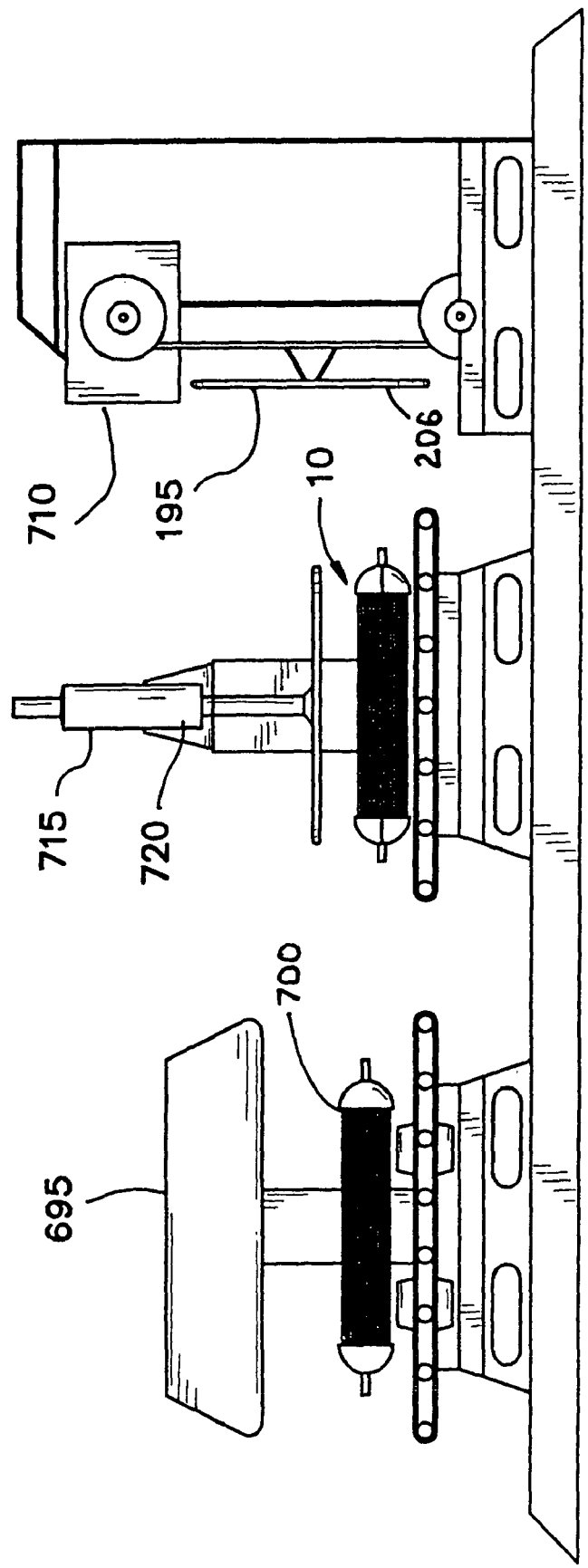
FIG. 23 is a side elevational view of an apparatus for curing the adhesive for the flexible tubes and attaching the reinforcing rings.

(25) An apparatus for fabricating a cellular reservoir flexible pressure vessel 10 may be constructed, as shown in FIG. 21, FIG. 22 and FIG. 23, from the following components. A raw plastic storage and feeding unit 580 is provided. The storage and feeding unit 580 contains a supply of raw plastic 585. A multi-head extruder 590 is provided. The extruder 590 includes a heating facility 595 and is in communication with the feeding unit 580. A cooling tank 600 is provided. The cooling tank 600 is located downstream from the extruder 590. A power puller 605 is provided. The puller 605 serves to pull a tubing bundle 610 from the cooling tank 600. Core tubing forming dies 615 are provided. The forming dies 615 form the tubing bundle 610 into a predetermined shape 616. A binder head 620 is provided. The binder head 620 has an attached binder tank 625 containing liquid binder material 630. A binder applicator 635 is provided. The binder applicator 635 comprises a secondary forming die 640 and serves to affix the binder material 630 to the tubing bundle 610. A cutting unit 645 is provided. The cutting unit 645 comprises a laser calibration facility 650 and serves to cut the tubing bundle 610 to a predetermined length 655. A conveyer facility 660 is provided. The conveyer facility 660 comprises means 665 for positioning a cut tubing bundle 610. A rotating head and ram 670 is provided. The head 670 comprises a glue head applicator 675. The glue head applicator 675 attaches to a glue tank 680. A plurality of preformed end caps 45, 50 are provided. An automated end cap loader 690 is provided. The end cap loader 690 positions the plurality of end caps 45, 50. An automated end cap installer 691 attached to the automated end cap loader 690 is provided. The installer 691 serves to attach the end caps 45, 50 to the tubing bundle 610. A high-intensity UV lamp assembly 695 is provided. The lamp assembly 695 serves to cure the glue 700.

(26) In a variant of the apparatus for fabricating a cellular reservoir flexible pressure vessel 10, as shown in FIG. 23, a plurality of reinforcing rings 195 is provided. The reinforcing rings 195 are formed of high-strength material 206. A reinforcing ring auto loader 710 is provided. A swivel ram 715 is provided. The ram 715 comprises of a ring loading and placement head 720. The swivel ram 715 is in cooperation with the ring auto loader 710 and serves to press the reinforcing ring 195 onto the pressure vessel 10.

Figure 24:
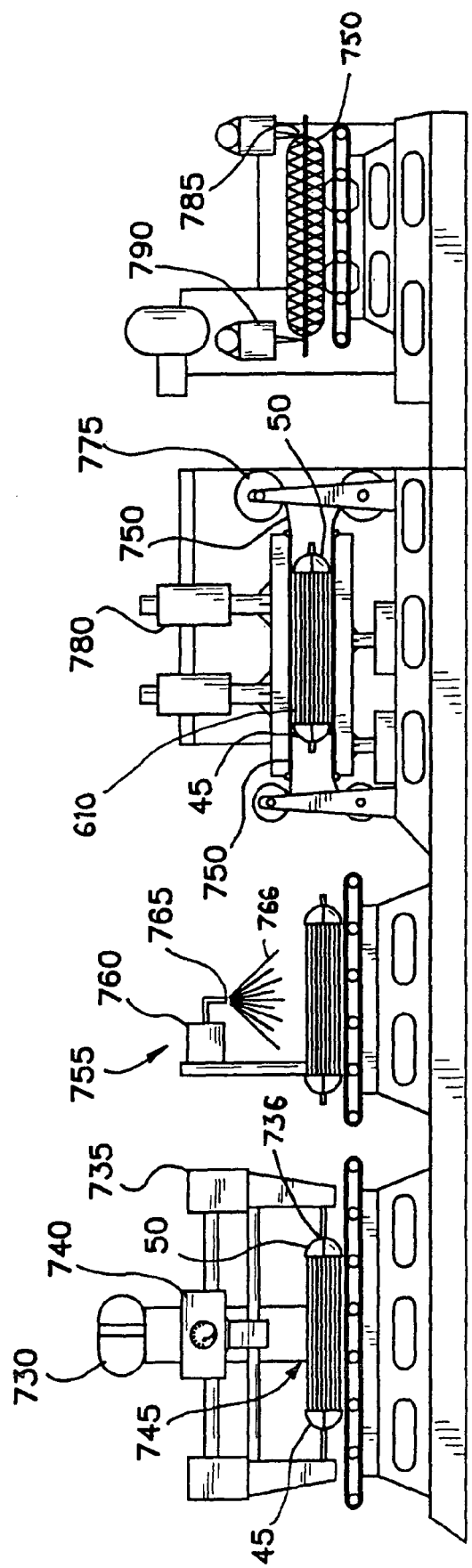
FIG. 24 is a side elevational view of apparatus for filling the vessel with cryogenic liquid or gas, attaching high-strength blanket material and stitching high-strength thread through the reinforcing blanket material.

(27) In another variant of the apparatus for fabricating a cellular reservoir flexible pressure vessel 10, as shown in FIG. 24, either a gas or liquid supply tank 730 is provided. An auto loader test head 735 is provided. The test head 735 is adaptable to fittings 736 on the end caps 45, 50. A cryogenic test unit 740 in communication with the test head 735 is provided. The test head 735 and the test unit 740 provides means 745 for pressurizing the pressure vessel 10.

(28) In yet a further variant of the apparatus for fabricating a cellular reservoir flexible pressure vessel 10, as shown in FIG. 24, reinforcing blanket material 750 is provided. A glue spraying mechanism 755 is provided. The mechanism 755 comprises glue tanks 760, glue spray heads 765 and glue 766 for attaching the blanket material 750 to the pressure vessel 10. A blanket material feed mechanism 775 is provided. A press forming tool 780 is provided. The tool 780 is adapted to form the blanket material 750 over the cut tubing bundle 610 and the attached end caps 45, 50.

(29) In a variant, as shown in FIG. 24, a high-strength thread 785 is provided. A stitching head 790 is provided. The stitching head 790 is adapted to sew the high-strength thread 785 through the reinforcing blanket material 750.

Figure 25:
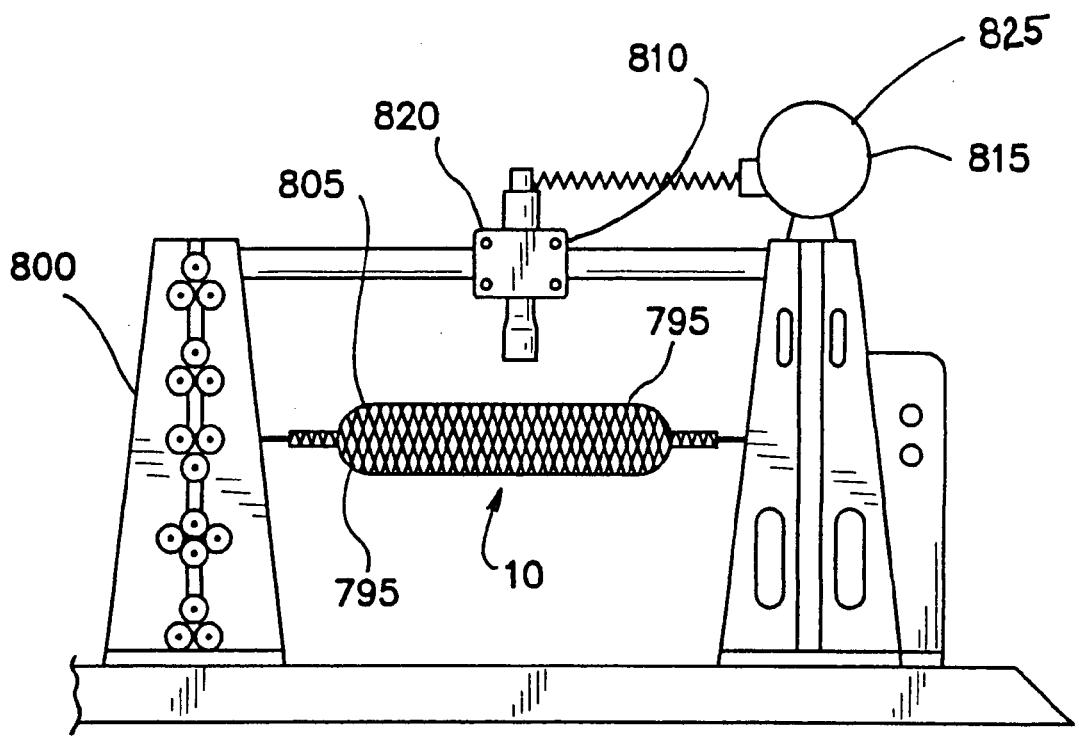
FIG. 25 is a side elevational view of an apparatus for overwrapping of the pressure vessel with high-strength braiding material.

(30) In still a further variant of the apparatus for fabricating a cellular reservoir flexible pressure vessel 10, as shown in FIG. 25, a high-strength braiding material 795 is provided. A braider 800 is provided. The braider 800 is adapted to position and provide overwrapping 805 of the pressure vessel 10 with the braiding material 795. A binder spraying mechanism 810 is provided. The spraying mechanism 810 comprises a binder tank 815, a binder spray head 820 and binder material 825.

Figure 26:
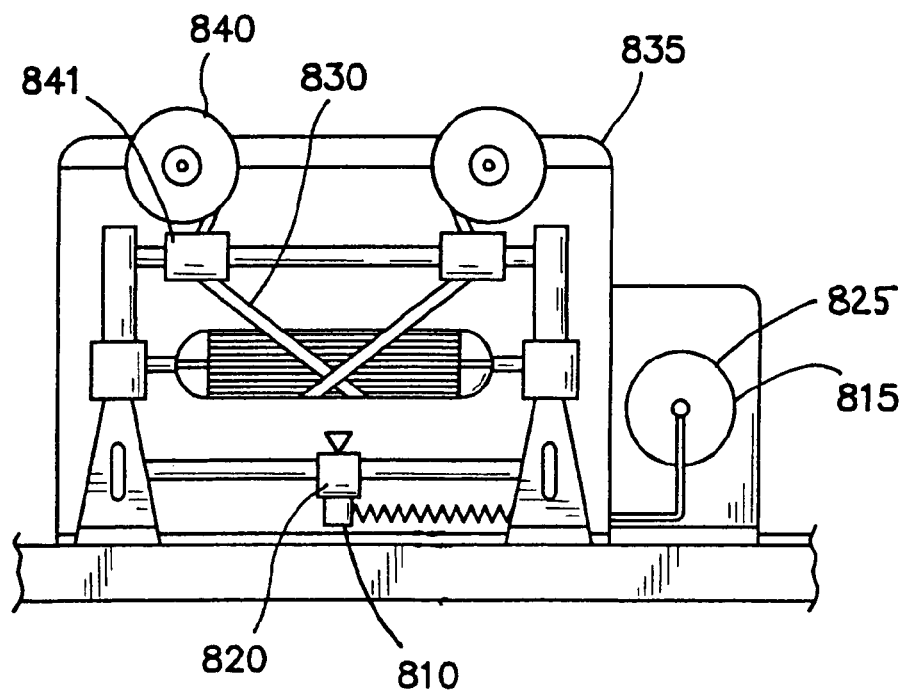
FIG. 26 is a side elevational view of an apparatus for hoop winding reinforcing ribbon onto the pressure vessel.

(31) In yet a further variant of the apparatus for fabricating a cellular reservoir flexible pressure vessel 10, as shown in FIG. 26, a high-strength reinforcing ribbon 830 is provided. An automated reinforcing ribbon winding machine 835 is provided. The winding machine 835 comprises of a reinforcing ribbon spool 840 and an auto layout ribbon head 841. A binder spraying mechanism 810 is provided. The spraying mechanism 810 comprises a binder tank 815, a binder spray head 820 and binder material 825.

Figure 27:
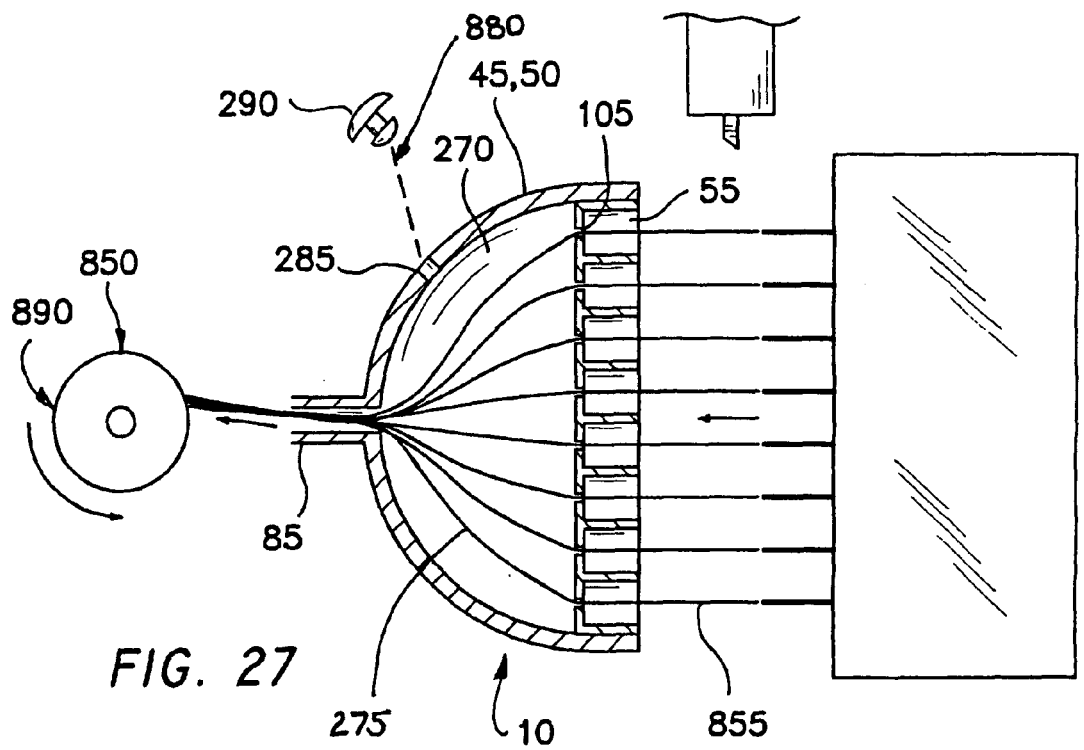
FIG. 27 is a side cross-sectional view of an apparatus for pulling wires into the end cap prior to injection of syntactic foam to leave canals.

(32) In still a further variant of the apparatus for fabricating a cellular reservoir flexible pressure vessel 10, as shown in FIG. 27, means 850 are provided for pulling a series of high tensile strength core wires 855 through orifices 105 in receptacles 55 in the end caps 45, 50 to a passageway 85 in the end caps 45, 50. Means 286 are provided for injecting sintactic foam 270 through an opening 285 in the end caps 45, 50. Means 880 are provided for attaching a sealing plug 290 to the opening 285. Means 890 are provided for removing the core wires 855 from the end caps 45, 50. When the core wires 855 are removed from the end caps 45, 50, a series of canals 275 will be formed in the sintactic foam 270 connecting orifices 105 in receptacles 55 in the end caps 45, 50 to the passageway 85.

Figure 28:
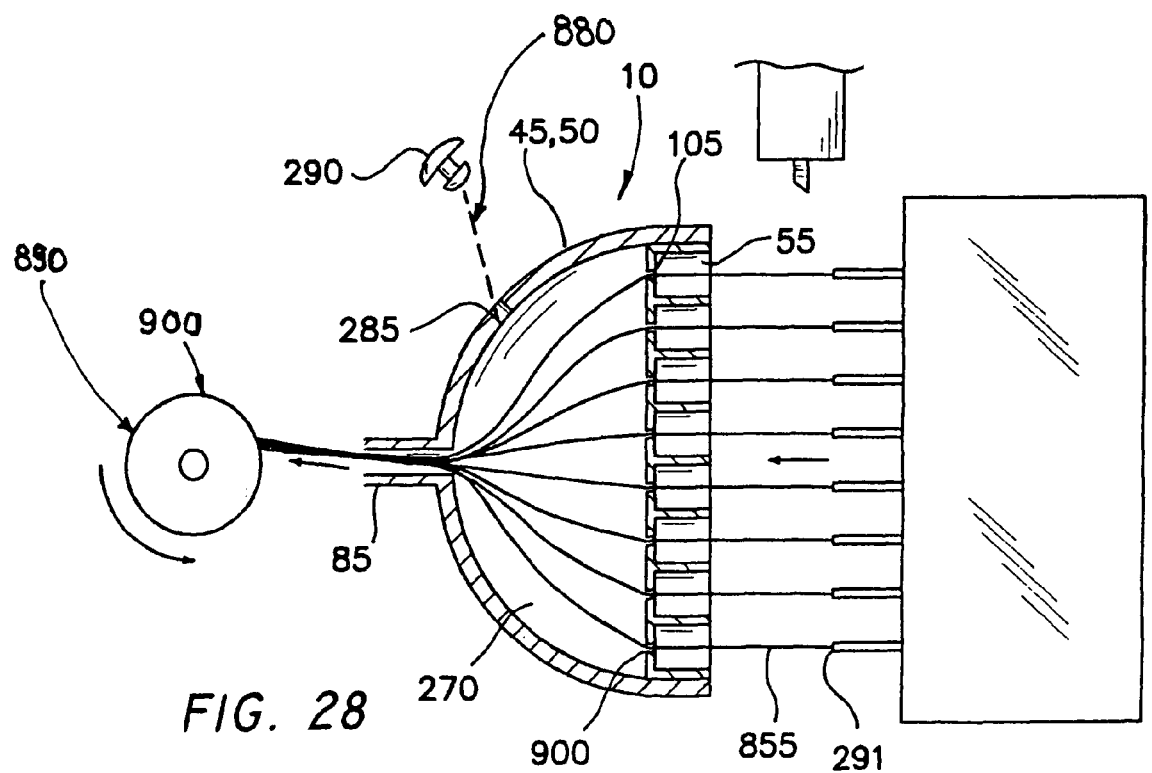
FIG. 28 is a side cross-sectional view of an apparatus for pulling microtubes into the end cap prior to injection of syntactic foam.
Figure 29:
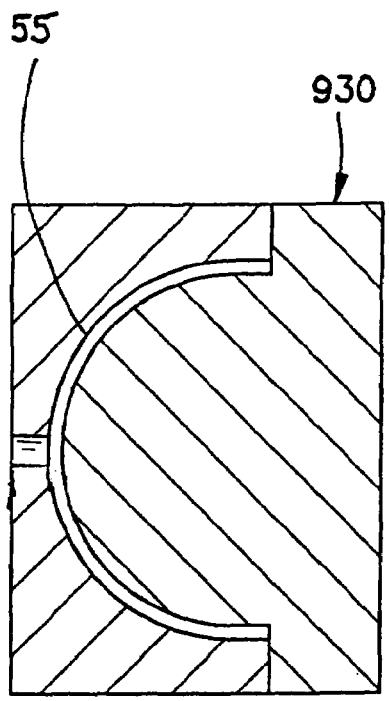
FIG. 29 is a detailed side cross-sectional view of an apparatus for forming a concave receptacle having a dome shape.
Figure 29A:
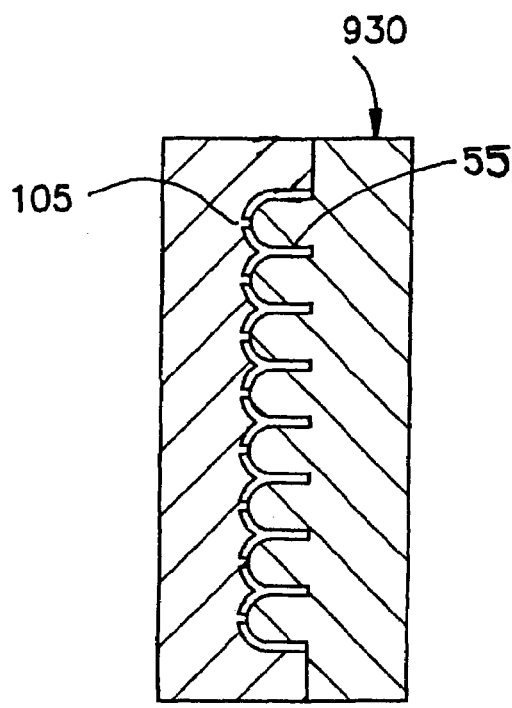
FIG. 29A is a side cross-sectional view of an apparatus for a series of concave receptacles having a dome shape.

(33) In yet a further variant of the apparatus for fabricating a cellular reservoir flexible pressure vessel 10, as shown in FIG. 28, means 900 are provided for attaching a series of flexible microtubes 291 to orifices 105 in receptacles 55 in the end caps 45, 50 to a passageway 85 in the end caps 45, 50. Means 286 are provided for injecting sintactic foam 270 through an opening 285 in the end caps 45, 50. Means 880 are provided for attaching a sealing plug 290 to the opening 285. Means 890 are provided for removing the core wires 855 from the end caps 45, 50. When the microtubes 291 are connected to the passageway 85, the pressure vessel 10 will provide an ultra clean environment for either liquids or gasses.

(34) In still a further variant of the apparatus for fabricating a cellular reservoir flexible pressure vessel 10, as shown in FIGS. 18B, 18C, 18D, 18E, 29 and 29A, means 930 are provided for forming a concave receptacle 485 having a shape selected from the group comprising: conical 490, dome-shaped 495, ellipsoid 500 and stair-stepped 505.

Figure 30:
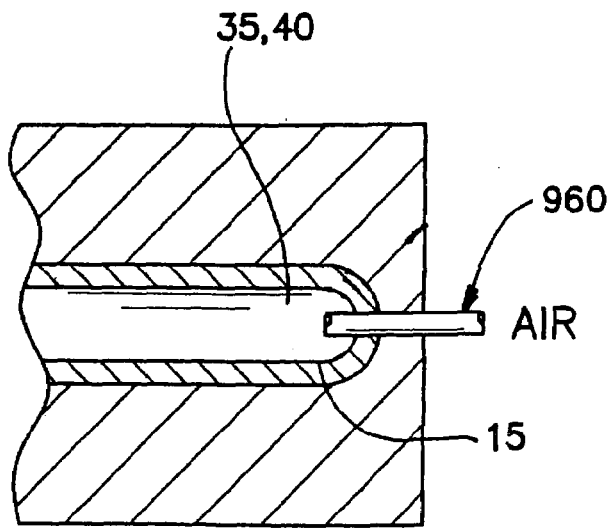
FIG. 30 is a side cross-sectional view of an apparatus for forming the first and second ends of each of said flexible tubes to fit sealably into said receptacles.

(35) In a variant, as shown in FIG. 30, means 960 are provided for forming the first 35 and second 40 ends of each of the flexible tubes 15 to fit sealably into the receptacles 55.

Figure 31:
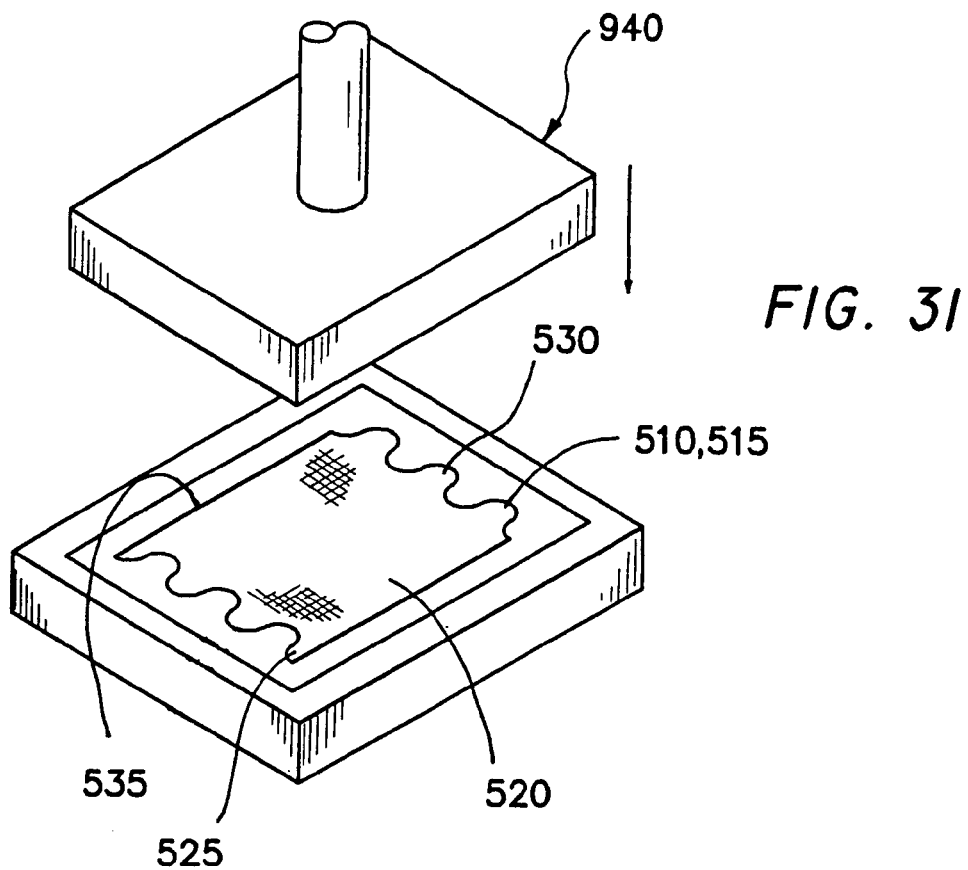
FIG. 31 is a perspective view of an apparatus for forming reinforcing panels.
Figure 32:
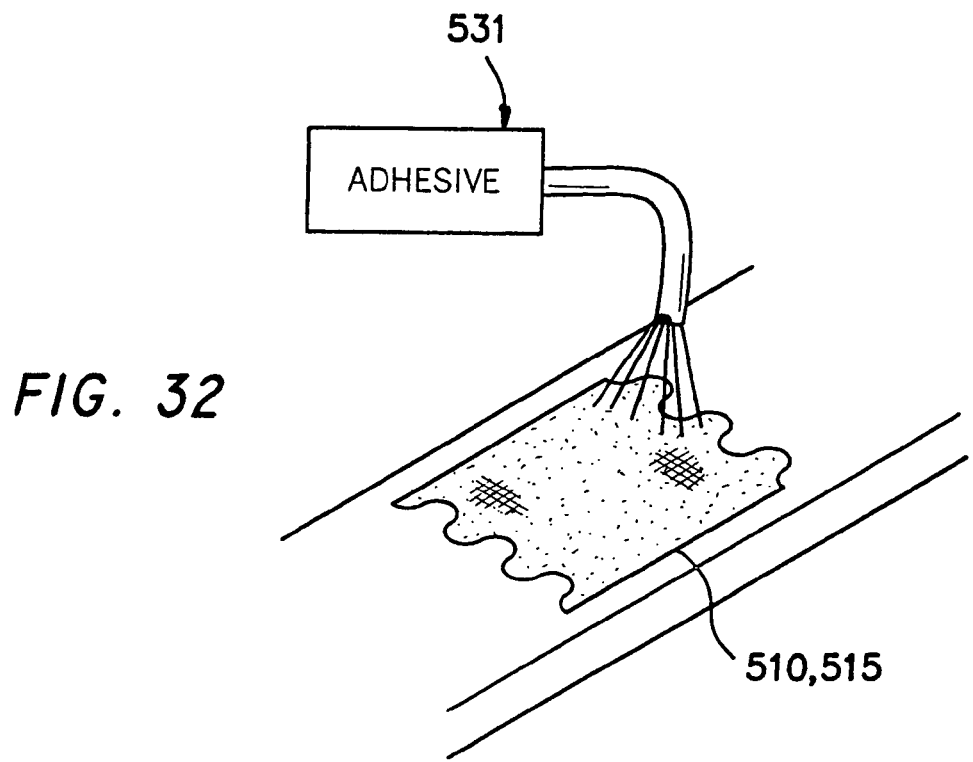
FIG. 32 is a perspective view of an apparatus for applying adhesive to a reinforcing panel.

(36) In yet a further variant of the apparatus for fabricating a cellular reservoir flexible pressure vessel 10, as shown in FIGS. 31 and 32, means 940 are provided for forming upper 510 and lower 515 reinforcing panels. The reinforcing panels 510, 515 are formed of high-strength woven material 520 and are shaped as a form 525 to cover at least half of a surface area 526 of the pressure vessel 10 with extensions 530 projecting from a perimeter 535 of the form 525. Means 531 are provided for adhering the reinforcing panels 510, 515 to the outer surface 536 of the pressure vessel 10, thereby increasing the pressure handling capability of the pressure vessel 10.

(37) In a variant, as shown in FIG. 32, the method of adhesion is selected from the group comprising: high-strength adhesive, sonic welding and RF welding.

(38) In a another variant, the woven material 520 is prepregnated with either adhesive or laminating material and subjected to heat and pressure.

Figures 33, 34, 38, 39:
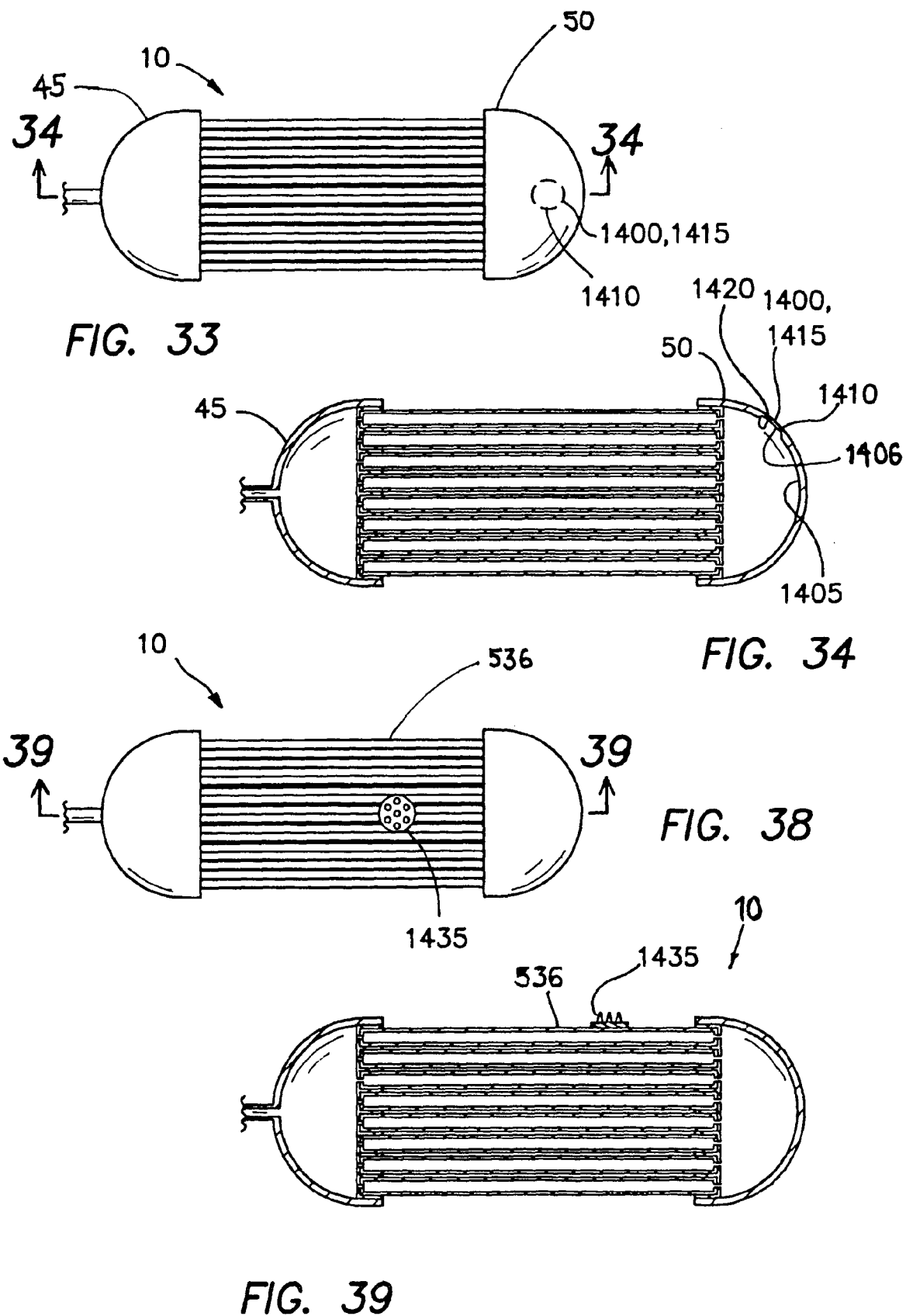
FIG. 33 is a plan view of an embodiment of the invention illustrating a first pressure relief device located on an inner surface of an end cap.
FIG. 34 is a cross-sectional view of the FIG. 33 embodiment taken along the line 34—34, illustrating the first pressure relief device on the inner surface of the end cap.
FIG. 38 is a plan view of the FIG. 35 embodiment illustrating a second pressure relief device which is removably attached.
FIG. 39 is a cross-sectional view of the FIG. 38 embodiment taken along the line 39—39.
Figure 35:
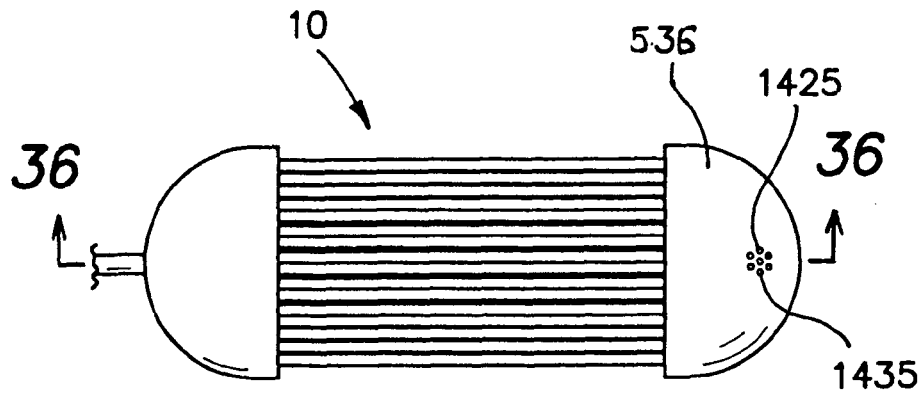
FIG. 35 is a plan view of an embodiment of the invention illustrating a second pressure relief device located on an outer surface of an end cap.

(53) In yet another variant, as shown in FIGS. 33 and 34, the cellular reservoir flexible pressure vessel 10, has a first pressure relief device 1400. The first pressure relief device 1400 is located on an inner surface 1405 of either the first 45 or second 50 end caps and includes a reduction in thickness 1406 of the end cap 45, 50 at a predetermined location 1410. When the pressure vessel 10 is subjected to an overpressure condition, it will fail at the predetermined location 1410.

(54) In still another variant, as shown in FIGS. 33 and 34, the first pressure relief device 1400 has an indentation 1415 in the inner surface 1405 of either the first 45 or second 50 end caps. The indentation 1415 has side walls 1420 angled inwardly from the inner surface 1405.

Figure 36:
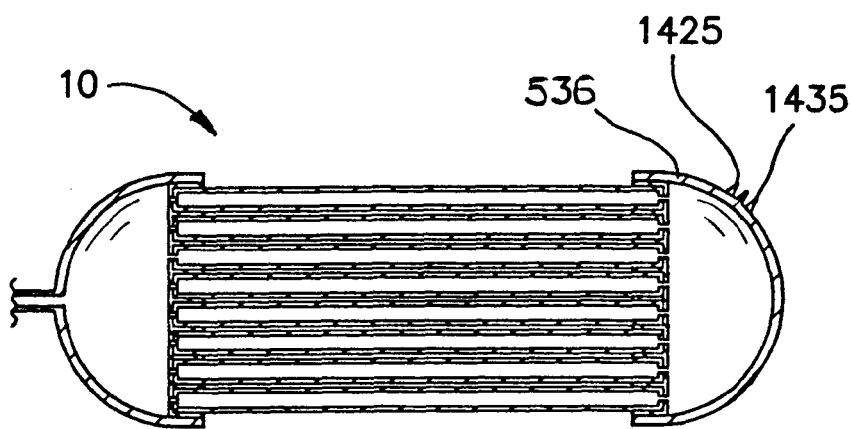
FIG. 36 is a cross sectional view of the FIG. 35 embodiment of the invention taken along the line 36—36 illustrating the second pressure relief device that has at least one projecting member.
Figure 37:
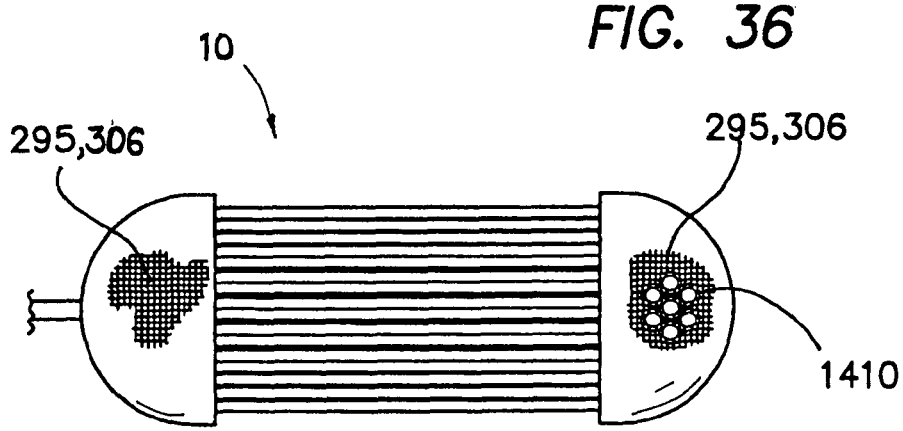
FIG. 37 is a plan view of an embodiment of the invention illustrating penetration of the second pressure relief device through the high strength braiding material at a predetermined location.
Figure 42:
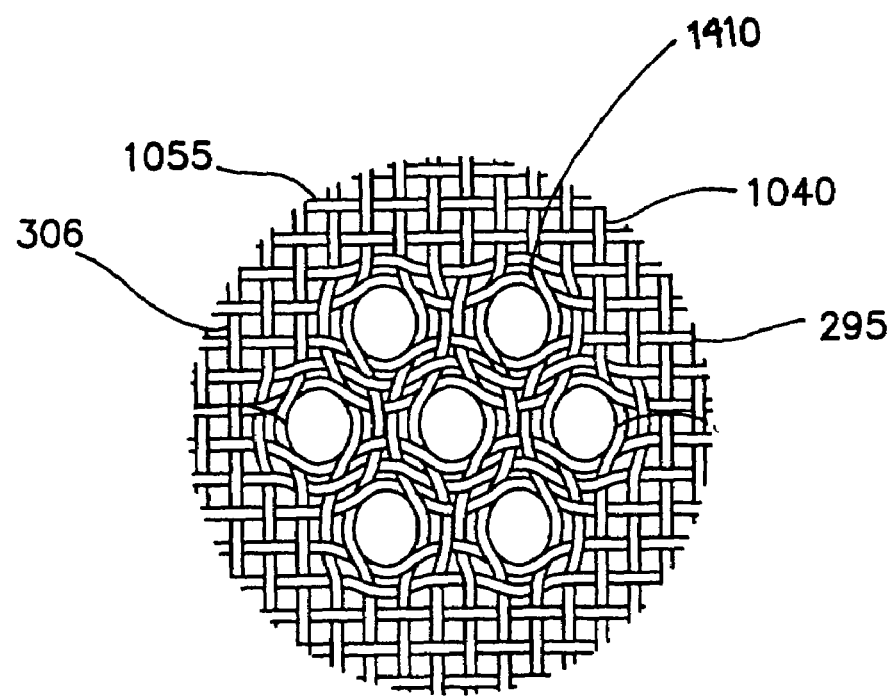
FIG. 42 is a partial detail view of a reinforcing panel or high strength braiding material with either a weakening or spreading of fibers at a predetermined location.

(55) In still a further variant, as shown in FIGS. 36, 37 and 42, the cellular reservoir flexible pressure vessel 10 has a second pressure relief device 1425. The second pressure relief device 1425 is located on an outer surface 536 of the flexible pressure vessel 10 and has at least one projecting member 1435. The projecting member 1435 is sized and shaped to penetrate the high-strength braiding material 295 at a predetermined location 1410. When the high-strength braiding material 295 is penetrated by the projecting member 1435 and the flexible pressure vessel 10 is subjected to an overpressure condition, the vessel 10 will fail at the predetermined location 1410.

(56) In an additional variant, as shown in FIGS. 38 and 39, the projecting member 1435 is removably attached to the outer surface 536 of the flexible pressure vessel 10.

(57) In another variant, as shown in FIGS. 36, 37 and 42, the cellular reservoir flexible pressure vessel 10 has a second pressure relief device 1425. The second pressure relief device 1425 is located on an outer surface 536 of the flexible pressure vessel 10 and has at least one projecting member 1435. The projecting member 1435 is sized and shaped to penetrate the high-strength material 306 at a predetermined location 1410. When the high-strength material 306 is penetrated by the projecting member 1435 and the flexible pressure vessel 10 is subjected to an overpressure condition, the vessel 10 will fail at the predetermined location 1410.

(58) In a further variant, as shown in FIGS. 38 and 39, the projecting member 1435 is removably attached to the outer surface 536 of the flexible pressure vessel 10.

Figure 41:
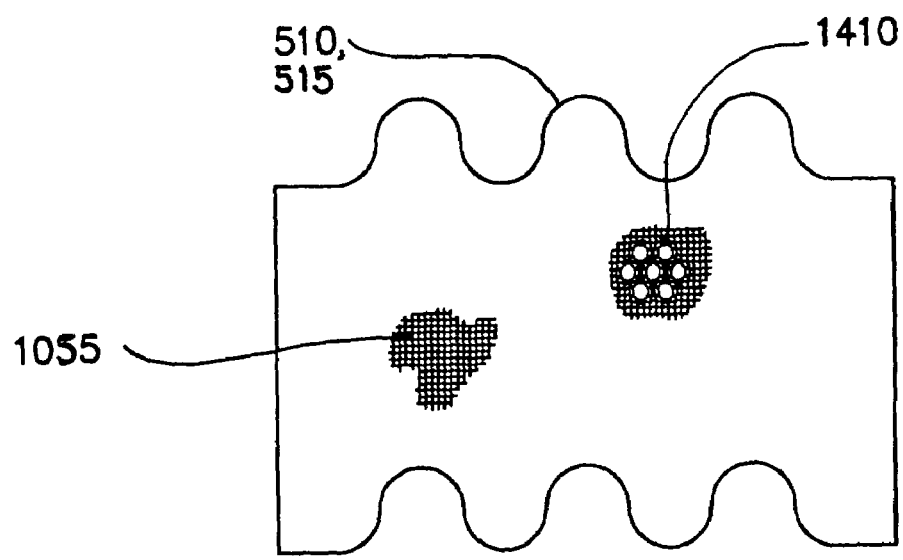
FIG. 41 is a plan view of a reinforcing panel with either a weakening or spreading of fibers at a predetermined location.

(59) In still a further variant, as shown in FIGS. 36 and 41, the cellular reservoir flexible pressure vessel 10 has a second pressure relief device 1425. The second pressure relief device 1425 is located on an outer surface 536 of the flexible pressure vessel 10 and has at least one projecting member 1435. The projecting member 1435 is sized and shaped to penetrate either the first 310 or second 335 flexible blankets at a predetermined location 1410. When either the first 310 or second 335 flexible blanket is penetrated by the projecting member 1435 and the flexible pressure vessel 10 is subjected to an overpressure condition, the vessel 10 will fail at the predetermined location 1410.

(60) In another variant of the invention, as shown in FIGS. 38 and 39, the projecting member 1435 is removably attached to the outer surface 536 of the flexible pressure vessel 10.

(61) In an additional variant of the invention, as shown in FIGS. 36, 41 and 42, the ovoid flexible pressure vessel 10 has a second pressure relief device 1425. The second pressure relief device 1425 is located on the outer surface 536 of the flexible pressure vessel 10 and has at least one projecting member 1435. The projecting member 1435 is sized and shaped to penetrate either the upper 510 or lower 515 reinforcing panels at a predetermined location 1410. When either the upper 510 or lower 515 reinforcing panel is penetrated by the projecting member 1435 and the flexible pressure vessel 10 is subjected to an overpressure condition, the vessel 10 will fail at the predetermined location 1410.

(62) In a further variant of the invention, as shown in FIGS. 38 and 39, the projecting member 1435 is removably attached to the outer surface 536 of the flexible pressure vessel 10.

(63) In still a further variant of the invention, as shown in FIGS. 43 and 44, the cellular reservoir flexible pressure vessel 10 has a third pressure relief device 990. The third pressure relief device 990 has a weakened section 995 of the passageway 85. When the flexible pressure vessel 10 is subjected to an overpressure condition, the flexible pressure vessel 10 will fail at the weakened section 995 of the passageway 85.

(64) In another variant, as shown in FIGS. 43 and 44, the weakened section 995 of the passageway 85 has a smaller cross-sectional area 1000 than a balance of the passageway 85.

Figure 49:
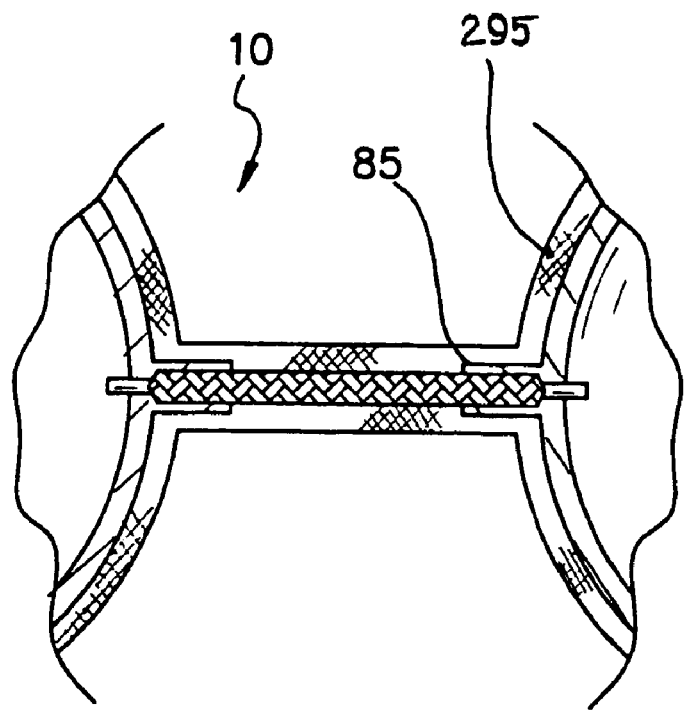
FIG. 49 is a cross-sectional view of an embodiment with high strength braiding material wound about the passageway providing additional resistance to pressure for the pressure vessel.

(65) In an additional variant, as shown in FIG. 49, the cellular reservoir flexible pressure vessel 10 has high-strength braiding material 295 wound about the passageway 85, thereby providing additional resistance to pressure for the flexible pressure vessel 10.

Figure 50:
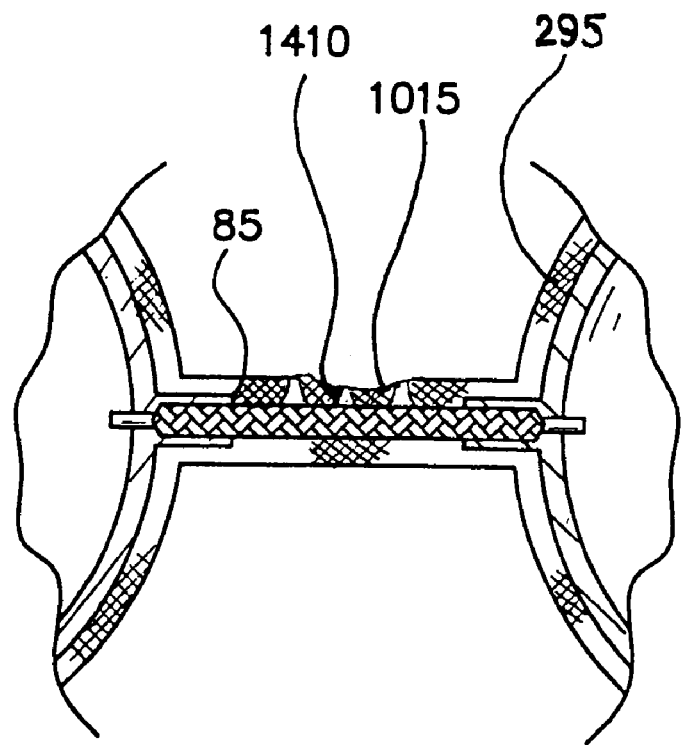
FIG. 50 is a cross-sectional view of the FIG. 49 embodiment illustrating a fourth pressure relief device that has either an absence or a weakening of high strength braiding material at a predetermined location on the passageway.

(66) In a further variant, as shown in FIG. 50, the cellular reservoir flexible pressure vessel 10 has a fourth pressure relief device 1015. The fourth pressure relief device 1015 has either a weakening or an absence of high-strength braiding material 295 at a predetermined location 1410 along the passageway 85. When the flexible pressure vessel 10 is subjected to an overpressure condition, the flexible pressure vessel 10 will fail at the predetermined location 1410 along the passageway 85.

Figure 51:
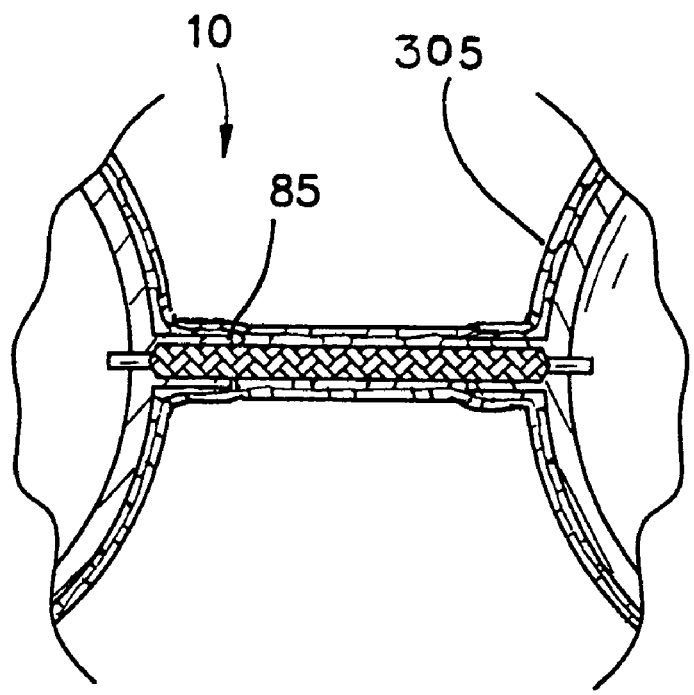
FIG. 51 is a cross-sectional view of an embodiment with hoop winding about the passageway providing additional resistance to pressure for the pressure vessel.

(67) In still a further variant, as shown in FIG. 51, the cellular reservoir flexible pressure vessel 10 has hoop winding 305 about the passageway 85, thereby providing additional resistance to pressure to the flexible pressure vessel 10.

Figure 52:
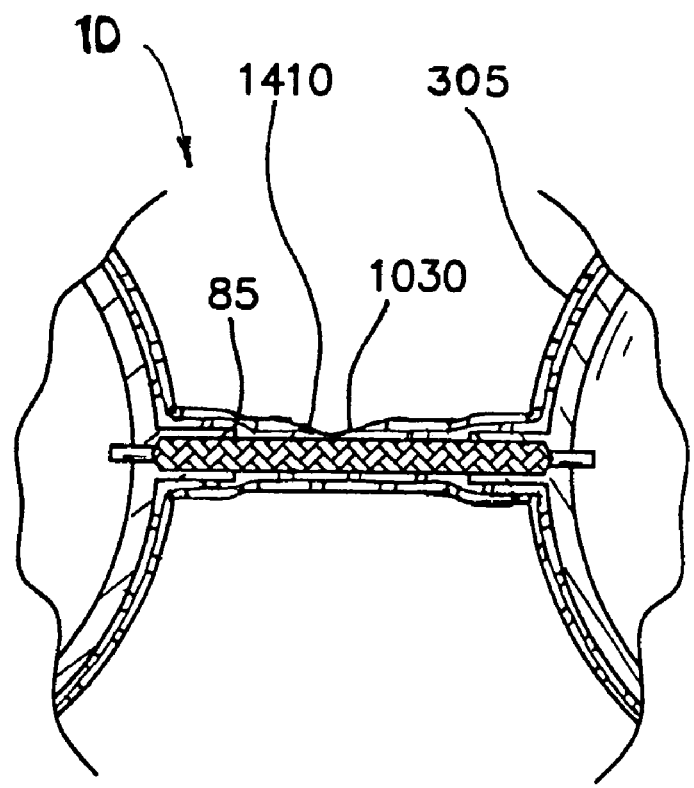
FIG. 52 is a cross-sectional view of the FIG. 51 embodiment illustrating a fourth pressure relief device that has either an absence or a weakening of hoop winding at a predetermined location on the passageway.

(68) In another variant of the invention, as shown in FIG. 52, the cellular reservoir flexible pressure vessel 10 has a fifth pressure relief device 1030. The fifth pressure relief device 1030 has either a weakening or an absence of hoop winding 305 at a predetermined location 1410 along the passageway 85. When the flexible pressure vessel 10 is subjected to an overpressure condition, the pressure vessel 10 will fail at the predetermined location 1410 along the passageway 85.

(69) In an additional variant, as shown in FIG. 42, the cellular reservoir flexible pressure vessel 10 has either a weakening or a spreading of fibers 1040 in the high-strength braiding material 295 at a predetermined location 1410. The predetermined location 1410 is above an outer surface 536 of the pressure vessel 10. When the high-strength braiding material 295 has the fibers 1040 weakened or spread in the predetermined location 1410 and the pressure vessel 10 is subjected to an overpressure condition, the pressure vessel 10 will fail at the predetermined location 1410.

(70) In a further variant, as shown in FIG. 42, the cellular reservoir flexible pressure vessel 10 has either a weakening or a spreading of fibers 1055 in the high-strength material 306 at a predetermined location 1410. The predetermined location 1410 is above an outer surface 536 of the pressure vessel 10. When the high-strength material 306 has the fibers 1055 weakened or spread in the predetermined location 1410 and the pressure vessel 10 is subjected to an overpressure condition, the pressure vessel 10 will fail at the predetermined location 1410.

(71) In still a further variant, as shown in FIGS. 47 and 48, the cellular reservoir flexible pressure vessel 10 has either a weakening or a spreading of fibers 1055 in either the first flexible blanket 310 or the second flexible blanket 335 at a predetermined location 1410. The predetermined location 1410 is above an outer surface 536 of the pressure vessel 10. When either of the first flexible blanket 310 and the second flexible blanket 335 has the fibers 1055 weakened or spread in the predetermined location 1410 and the pressure vessel 10 is subjected to an overpressure condition, the pressure vessel 10 will fail at the predetermined location 1410.

(72) In another variant of the invention, as shown in FIG. 41, the cellular reservoir flexible pressure vessel 10 has either a weakening or a spreading of fibers 1055 in either the upper 510 or lower 515 reinforcing panels at a predetermined location 1410. The predetermined location 1410 is above the outer surface 536 of the pressure vessel 10. When either of the upper 510 or lower 515 reinforcing panels has the fibers 1040 weakened or spread in the predetermined location 1410 and the pressure vessel 10 is subjected to an overpressure condition, the pressure vessel 10 will fail at the predetermined location 1410.

Figure 45:
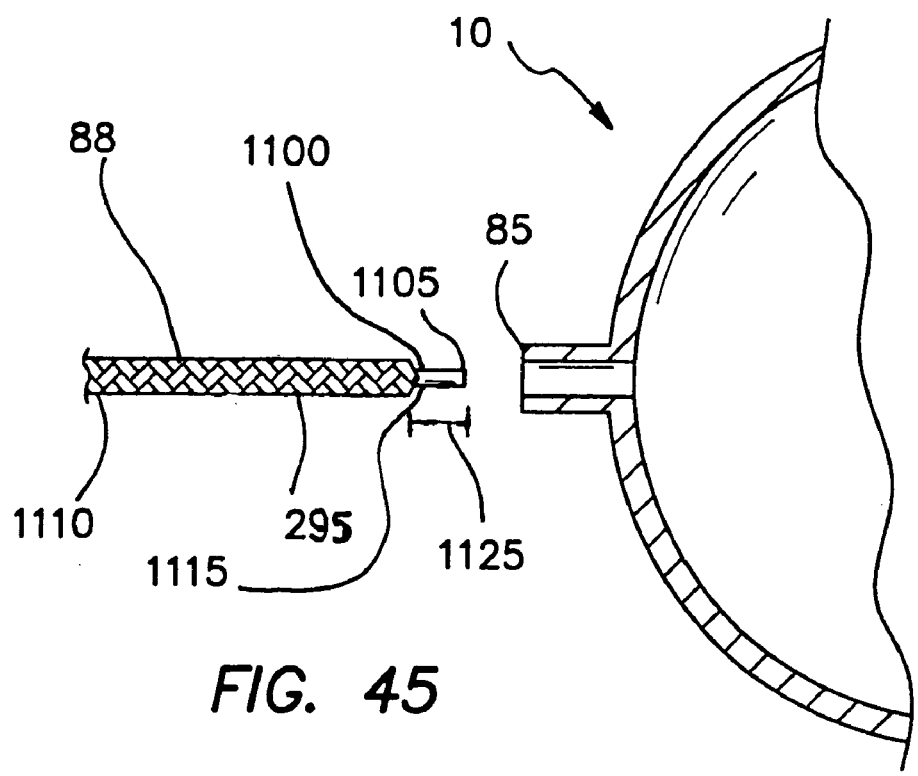
FIG. 45 is a cross-sectional view of an embodiment illustrating the connection of a capillary tube to a passageway and to an end cap prior to insertion and welding.
Figure 46:
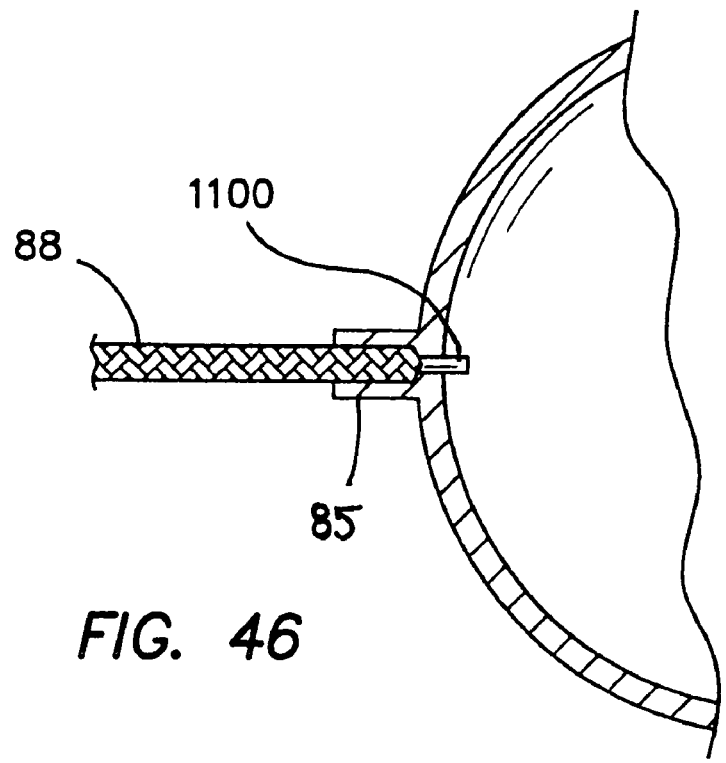
FIG. 46 is a cross-sectional view of the FIG. 45 embodiment illustrating attachment of the capillary tube to the passageway and end cap.

(73) In an additional variant of the invention, as shown in FIGS. 45 and 46, the connection 88 to either a passageway 85 of another pressure vessel 10 or a valve 90 further has a capillary tube 1100. The capillary tube 1100 has a proximate end 1105 and a distal end 1110 and is formed of resilient material 1115 and sized and shaped to fit slidably within the passageway 85. High-strength braiding material is provided 295. The braiding material 295 is located about the capillary tube 1100 and extends along the capillary tube 1100 to within a first predetermined distance 1125 from the proximate end 1105. The proximate end 1105 of the braiding 295 covered capillary tube 1100 is inserted into the passageway 85 and is either radio frequency welded or secured with adhesive to it. When the proximate end 1105 of the capillary tube 1100 is either welded or secured with adhesive within the passageway 85, it will be permanently attached to it.

Figure 40:
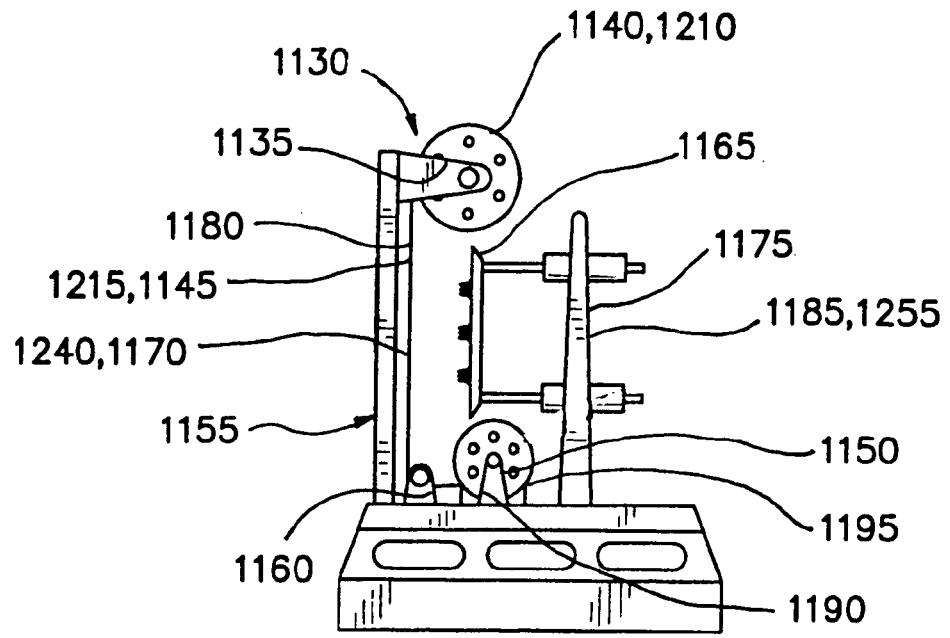
FIG. 40 is a side elevational view of an apparatus for modifying flexible blanket material and for modifying reinforcing panel material.
Figure 40A:
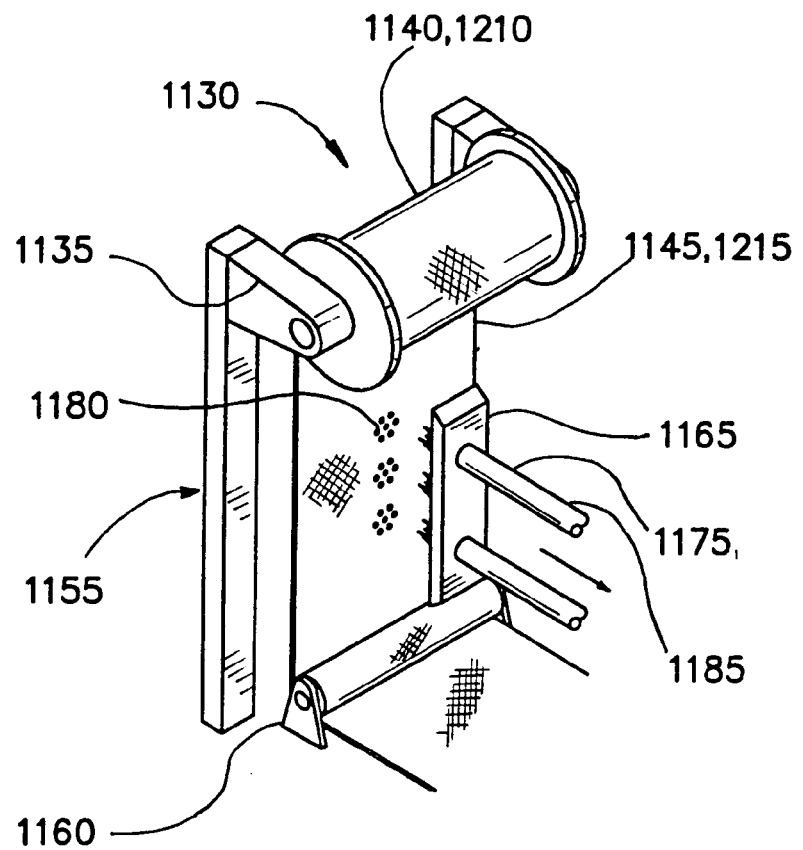
FIG. 40A is perspective view of the FIG. 40 apparatus illustrating the modified fabric or blanket material.

(74) In a further variant of the invention, as shown in FIGS. 40 and 40A, an apparatus 1130 for modifying flexible blanket material 1145 is provided. The apparatus 1130 has means 1135 for supporting a supply roll 1140 of flexible blanket material 1145. Means 1150 for moving the flexible blanket material 1145 from the supply roll 1140 to a work area 1155 is provided. Means 1160 for tensioning the flexible blanket material 1145 in the work area 1155 is also provided. At least one separating member 1165 is provided. The separating member 1165 is sized and shaped to penetrate and separate fibers 1055 of the flexible blanket material 1145 is further provided.

Means 1175 for moving the separating member 1165 into the tensioned flexible blanket material 1145 at a predetermined location 1180 in the material 1145, thereby either weakening and separating the fibers 1055 is provided. Means 1185 for retracting the separating member 1165 from the tensioned flexible blanket material 1145 is provided. Means 1190 for moving the flexible blanket material 1145 from the work area 1155 to a storage area 1195 is provided. The flexible blanket material 1145 will have either a weakened or separated fibers 1055 in the predetermined location 1180 prior to application to the pressure vessel 10.

(75) In still a further variant of the invention, as shown in FIGS. 40 and 40A, an apparatus 1130 for modifying reinforcing panel material 1215 is provided. The apparatus 1130 has means 1135 for supporting a supply roll 1210 of reinforcing panel material 1215. Means 1150 for moving the reinforcing panel material 1215 from the supply roll 1210 to a work area 1155 is provided. Means 1160 for tensioning the reinforcing panel material 1215 in the work area 1155 is provided. At least one separating member 1165 is provided. The separating member 1165 is sized and shaped to penetrate and separate fibers 1055 of the reinforcing panel material 1215. Means 1175 for moving the separating member 1165 into the tensioned reinforcing panel material 1145 at a predetermined location 1180 in the material 1215, thereby either weakening or separating the fibers 1055 is provided. Means 1185 for retracting the separating member 1165 from the tensioned reinforcing panel material 1215 is provided. Means 1190 for moving the reinforcing panel material 1215 from the work area 1155 to a storage area 1195 is provided. The reinforcing panel material 1215 will have either weakened or separated fibers 1055 in the predetermined location 1180 prior to application to the pressure vessel 10.

The invention claimed is:

1. A cellular reservoir flexible pressure vessel, comprising:
   a plurality of flexible tubes, each of said tubes having an outer surface, an inner surface, a first end and a second end;
   first and second end caps, each of said end caps having a receptacle for either of the first and second ends of each of said flexible tubes, a collecting reservoir, a surrounding outer rim and an outer perimeter perpendicular to said surrounding outer rim;
   at least one of said first and second end caps having a passageway connecting to said collecting reservoir as a connection to either of a passageway of another pressure vessel and a valve;
   each of said receptacles having a surrounding wall, a base and an orifice penetrating said base;
   said orifice connecting said receptacle to either of said collecting reservoir and said passageway;
   said wall having an interior surface, said interior surface being sized and shaped to fit frictionally over said outer surface of one of said flexible tubes at either of said first and second ends;
   said collecting reservoir having an outer surface and connecting said base of each of said receptacles to a common space, said common space being either of closed and connected to said passageway;
   said surrounding outer rim extending outwardly from said outer surface of said collecting reservoir for a first predetermined distance along said flexible tubes and serving to constrain said flexible tubes;
   means for securing said first and second end caps to said flexible tubes;
   a valving means, said valving means being capable of controlling a flow of either of a liquid and a gas through said passageway and being attached to a distal end of said passageway; and
   whereby, when said flexible tubes are inserted into said receptacles of said end caps and secured thereto, a flexible pressure vessel will be formed capable of containing either of a liquid and a gas at high pressure.

2. A cellular reservoir flexible pressure vessel, as described in claim 1, wherein the means for securing the first and second end caps to the flexible tubes is selected from the group comprising:
   radio frequency welding, high-strength adhesive, mechanical fastening and sonic welding.

3. A cellular reservoir flexible pressure vessel, as described in claim 1, further comprising:
   a protruding rim, said protruding rim being disposed at said outer perimeter of said first and second end caps and upper and lower receiving notches disposed above and below said protruding rim;
   a reinforcing ring, said reinforcing ring having an inner surface, an outer surface, being formed of high-strength material and being sized and shaped to fit tightly about the outer perimeter of said end caps;
   said reinforcing ring having an upper and lower projecting ribs and a central receiving notch disposed between said upper and lower projecting ribs;
   said projecting ribs being sized, shaped and disposed to fit said upper and lower receiving notches of said end caps;
   said central receiving notch being sized, shaped and disposed to fit said protruding rim of said end caps;
   said reinforcing ring having an aperture, said aperture extending from said inner surface to said outer surface and being sized, shaped and disposed to accommodate said passageway of said end caps;
   whereby, when said reinforcing ring is disposed about the outer perimeter of said first and second end caps, the pressure handling capacity of said pressure vessel is increased.

4. A cellular reservoir flexible pressure vessel, as described in claim 1, further comprising:
   a protruding rim; said protruding rim being disposed at said outer perimeter of said first and second end caps and upper and lower receiving notches, said upper and lower receiving notches being disposed above and below said protruding rim;
   upper and lower a reinforcing rings, each of said reinforcing rings having an inner surface, an outer surface, being formed of high-strength material and being sized and shaped to fit tightly in either of said upper and lower receiving notches;
   at least one of said reinforcing rings having an aperture, said aperture extending from said inner surface to said outer surface and being sized, shaped and disposed to accommodate said passageway connecting to said collecting reservoir; and
   whereby, when said reinforcing rings are disposed about the outer perimeter of said first and second end caps, the pressure handling capacity of said pressure vessel is increased.

5. A cellular reservoir flexible pressure vessel as described in claim 4, further comprising means for fastening said upper reinforcing ring to said lower reinforcing ring.

6. A cellular reservoir flexible pressure vessel, as described in claim 1, further comprising:
   A protruding rim, said protruding rim being disposed at said outer perimeter of said first and second end caps;
   at least one groove disposed about said outer perimeter above said protruding rim;
   at least one groove disposed about said outer perimeter below said protruding rim;
   upper and lower reinforcing rings, each of said reinforcing rings having an inner surface, an outer surface, being formed of high-strength material and being sized and shaped to fit tightly about said outer perimeter on either side of said protruding rim;
   each of said reinforcing rings having at least one rib disposed upon the inner surface thereof, said rib being sized, shaped and disposed to engage said groove; and
   whereby, when said reinforcing rings are disposed about the outer perimeter of said first and second end caps, the pressure handling capacity of said pressure vessel is increased.

7. A cellular reservoir flexible pressure vessel as described in claim 6, further comprising means for fastening said upper reinforcing ring to said lower a reinforcing ring.

8. A cellular reservoir flexible pressure vessel as described in claim 1, further comprising:
   a sintactic foam filler, said foam filler being disposed within said collecting reservoir of at least one of said first and second end caps;

said foam filler having a series of canals therethrough, each of said canals connecting said orifice of said receptacle to said passageway;

an opening in said end caps, said opening providing means for introduction of said sintactic foam into said end caps;

a sealing plug, said sealing plug being sized and shaped to fit sealably into said opening in said end caps; and whereby, when said sintactic foam is introduced into said end caps, the pressure handling capacity of said pressure vessel is increased.

9. A cellular reservoir flexible pressure vessel as described in claim 1, further comprising:

a sintactic foam filler, said foam filler being disposed within said collecting reservoir of at least one of said first and second end caps;

said foam filler being penetrated by a series of flexible microtubes, each of said microtubes connecting said orifice of said receptacle to said passageway;

an opening in said end caps, said opening providing means for introduction of said sintactic foam into said end caps;

a sealing plug, said sealing plug being sized and shaped to fit sealably into said opening in said end caps; and whereby, when said microtubes are connected to the orifices of said receptacles in said end caps, the purity of either of liquids and gasses stored in said pressure vessel is increased.

10. A cellular reservoir flexible pressure vessel, as described in claim 1, further comprising:

an overwrapping of high-strength braiding material, said braiding material extending over said flexible tubes and said first and second end caps; and whereby, when the flexible pressure vessel is so overwrapped, its pressure-handling capability will be increased.

11. A cellular reservoir flexible pressure vessel, as described in claim 10, further comprising a plastic overcoating, said overcoating further increasing the pressure-handling capability of the pressure vessel.

12. The cellular reservoir flexible pressure vessel, as described in claim 10, further comprising:

a pressure relief device, said pressure relief device disposed upon an outer surface of said flexible pressure vessel and comprising at least one projecting member, said at least one projecting member being sized and shaped to penetrate said high-strength braiding material at a predetermined location; and whereby, when said high-strength braiding material is penetrated by said projecting member and said flexible pressure vessel is subjected to an overpressure condition, said vessel will fail at said predetermined location.

13. The cellular reservoir flexible pressure vessel, as described in claim 12, wherein said at least one projecting member is removably attached to said outer surface of said flexible pressure vessel.

14. The cellular reservoir flexible pressure vessel, as described in claim 10, further comprising:

either of a weakening and a spreading of fibers in said high-strength braiding material at a predetermined location;

said predetermined location being above an outer surface of said pressure vessel; and whereby, when said high-strength braiding material has said fibers weakened or spread in said predetermined location and said pressure vessel is subjected to an overpressure condition, said pressure vessel will fail at said predetermined location.

15. A cellular reservoir flexible pressure vessel, as described in claim 1, further comprising:

hoop winding with high-strength materials, said hoop winding extending over said flexible tubes and said first and second end caps; and whereby, when the flexible pressure vessel is so hoop wound, its pressure-handling capability will be increased.

16. The cellular reservoir flexible pressure vessel, as described in claim 15, further comprising:

a pressure relief device, said pressure relief device disposed upon an outer surface of said flexible pressure vessel and comprising at least one projecting member, said at least one projecting member being sized and shaped to penetrate said high-strength material at a predetermined location; and whereby, when said high-strength material is penetrated by said projecting member and said flexible pressure vessel is subjected to an overpressure condition, said vessel will fail at said predetermined location.

17. The cellular reservoir flexible pressure vessel, as described in claim 16, wherein said at least one projecting member is removably attached to said outer surface of said flexible pressure vessel.

18. The cellular reservoir flexible pressure vessel, as described in claim 15, further comprising:

either of a weakening and a spreading of fibers in said high-strength material at a predetermined location;

said predetermined location being above an outer surface of said pressure vessel; and whereby, when said high-strength material has said fibers weakened or spread in said predetermined location and said pressure vessel is subjected to an overpressure condition, said pressure vessel will fail at said predetermined location.

19. A cellular reservoir flexible pressure vessel, as described in claim 15, further comprising a plastic overcoating, said overcoating further increasing the pressure-handling capability of the pressure vessel.

20. A cellular reservoir flexible pressure vessel, as described in claim 1, further comprising:

a first flexible blanket, said first blanket having an upper surface, a lower surface and being sized and shaped to cover said pressure vessel and extending outwardly beyond outer edges thereof;

said first blanket being fixedly attached at its lower surface to an upper surface of said pressure vessel;

a second flexible blanket, said second blanket having an upper surface, a lower surface and being sized and shaped to cover said pressure vessel and extending outwardly beyond said outer edges;

said second blanket being fixedly attached at its upper surface to a lower surface of said pressure vessel; and whereby, when said first and second flexible blankets are attached to said pressure vessel, the pressure handling capability of the pressure vessel will be increased.

21. A cellular reservoir flexible pressure vessel as described in claim 20, wherein heavy duty stitching is used to attach the first blanket to the second blanket, said stitching penetrating the first and second blankets and serving to further reinforce and increase the pressure-handling capabilities of the pressure vessel.

22. A cellular reservoir flexible pressure vessel as described in claim 21, wherein the heavy duty stitching is high pressure hoop and lock braiding.

23. The cellular reservoir flexible pressure vessel, as described in claim 20, further comprising:
- a pressure relief device, said pressure relief device disposed upon an outer surface of said flexible pressure vessel and comprising at least one projecting member, said at least one projecting member being sized and shaped to penetrate either of said first and second flexible blankets at a predetermined location; and
- whereby, when either of said first and second flexible blankets is penetrated by said projecting member and said flexible pressure vessel is subjected to an overpressure condition, said vessel will fail at said predetermined location.

24. The cellular reservoir flexible pressure vessel, as described in claim 23, wherein said at least one projecting member is removably attached to said outer surface of said flexible pressure vessel.

25. The cellular reservoir flexible pressure vessel, as described in claim 20, further comprising:
- either of a weakening and a spreading of fibers in either of said first flexible blanket and said second flexible blanket at a predetermined location;
- said predetermined location being above an outer surface of said pressure vessel; and
- whereby, when either of said first flexible blanket and said second flexible blanket has said fibers weakened or spread in said predetermined location and said pressure vessel is subjected to an overpressure condition, said pressure vessel will fail at said predetermined location.

26. A method for making the cellular reservoir flexible pressure vessel as described in claim 25, comprising the steps of:
- providing a supply roll of flexible blanket material;
- supporting said supply roll;
- moving said flexible blanket material from said supply roll to a work area;
- tensioning said flexible blanket material in said work area;
- providing at least one separating member, said separating member being sized and shaped to penetrate and separate fibers of said flexible blanket material;
- moving said separating member into said tensioned flexible blanket material at a predetermined location in said material, thereby either of weakening and separating said fibers;
- retracting said separating member from said tensioned flexible blanket material;
- moving said flexible blanket material from work area to a storage area; and
- whereby, said flexible blanket material will have either of weakened or separated fibers in said predetermined location prior to application to said pressure vessel.

27. A cellular reservoir flexible pressure vessel, as described in claim 1, wherein the cross-sectional shape of the outer surface of the flexible tubing is selected from the group comprising:
- square, triangular, round, ovoid, octagonal and star-shaped.

28. A cellular reservoir flexible pressure vessel, as described in claim 1, wherein the cross-sectional shape of the inner surface of the flexible tubing is selected from the group comprising:
- square, triangular, round, ovoid, octagonal and star-shaped.

29. A cellular reservoir flexible pressure vessel, as described in claim 1, wherein the cross-sectional shape of the flexible pressure vessel is selected from the group comprising:
- square, triangular, round, hexagonal, ovoid, octagonal, pillow shaped, saddle shaped and a flattened mat shape.

30. A cellular reservoir flexible pressure vessel, as described in claim 1, wherein:
- each of said receptacles are of a concave form selected from the group comprising:
- conical, dome-shaped, ellipsoid and stair-stepped.

31. A cellular reservoir flexible pressure vessel, as described in claim 30, wherein said first and second ends of each of said flexible tubes are sized and shaped to fit sealably into said receptacles.

32. A cellular reservoir pressure vessel as described in claim 1, further comprising:
- upper and lower reinforcing panels, said reinforcing panels being formed of high-strength woven material and being shaped as a form to cover at least half of a surface area of said pressure vessel with extensions projecting from a perimeter of said form; and
- said reinforcing panels being adhered to an outer surface of said pressure vessel, thereby increasing the pressure handling capability of said vessel.

33. A cellular reservoir flexible pressure vessel as described in claim 32, wherein the method of adhesion is selected from the group comprising:
- high-strength adhesive, sonic welding and RF welding.

34. A cellular reservoir flexible pressure vessel as described in claim 32, wherein the woven material is prepregnated with either of adhesive and laminating material and subjected to heat and pressure.

35. The cellular reservoir flexible pressure vessel, as described in claim 32, further comprising:
- a pressure relief device, said pressure relief device disposed upon said outer surface of said flexible pressure vessel and comprising at least one projecting member, said at least one projecting member being sized and shaped to penetrate either of said upper and lower reinforcing panels at a predetermined location; and
- Whereby, when said either of said upper and lower reinforcing panels is penetrated by said projecting member and said flexible pressure vessel is subjected to an overpressure condition, said vessel will fail at said predetermined location.

36. The cellular reservoir flexible pressure vessel, as described in claim 35, wherein said at least one projecting member is removably attached to said outer surface of said flexible pressure vessel.

37. The cellular reservoir flexible pressure vessel, as described in claim 32, further comprising:
- either of a weakening and a spreading of fibers in either of said upper and lower reinforcing panels at a predetermined location;
- said predetermined location being above said outer surface of said pressure vessel; and
- whereby, when either of said upper and lower reinforcing panels has said fibers weakened or spread in said predetermined location and said pressure vessel is subjected to an overpressure condition, said pressure vessel will fail at said predetermined location.

38. A method for making the cellular reservoir flexible pressure vessel as described in claim 37, comprising:
- providing a supply roll of reinforcing panel material;
- means for supporting said supply roll;
- moving said reinforcing panel material from said supply roll to a work area;
- tensioning said reinforcing panel material in said work area;

providing at least one separating member, said separating member being sized and shaped to penetrate and separate fibers of said reinforcing panel material;

moving said separating member into said tensioned reinforcing panel material at a predetermined location in said material, thereby either of weakening and separating said fibers;

retracting said separating member from said tensioned reinforcing panel material;

moving said reinforcing panel material from work area to a storage area; and whereby, said reinforcing panel material will have either of weakened and separated fibers in said predetermined location prior to application to said pressure vessel.

39. The cellular reservoir flexible pressure vessel, as described in claim 1, further comprising:
a first pressure relief device, said first pressure relief device disposed upon an inner surface of either of said first and second end caps and comprising a reduction in thickness of said end cap at a predetermined location;
whereby, when said pressure vessel is subjected to an overpressure condition it will fail at said predetermined location.

40. The cellular reservoir flexible pressure vessel, as described in claim 39, wherein said first pressure relief device comprises an indentation in said inner surface of either of said first and second end caps, said indentation having side walls angled inwardly from said inner surface.

41. The cellular reservoir flexible pressure vessel, as described in claim 1, further comprising:
a pressure relief device, said pressure relief device comprising a weakened section of said passageway; and
whereby, when said flexible pressure vessel is subjected to an overpressure condition, said flexible pressure vessel will fail at said weakened section of said passageway.

42. The cellular reservoir flexible pressure vessel, as described in claim 41, wherein said weakened section of said passageway has a smaller cross-sectional area than a balance of said passageway.

43. The cellular reservoir flexible pressure vessel, as described in claim 1, further comprising high-strength braiding material wound about said passageway, thereby providing additional resistance to pressure for said flexible pressure vessel.

44. The cellular reservoir flexible pressure vessel, as described in claim 43, further comprising:
a pressure relief device, said pressure relief device comprising either of a weakening and an absence of high-strength braiding material at a predetermined location along said passageway; and
whereby, when said flexible pressure vessel is subjected to an overpressure condition, said flexible pressure vessel will fail at said predetermined location along said passageway.

45. The cellular reservoir flexible pressure vessel, as described in claim 1, further comprising hoop winding about said passageway, thereby providing additional resistance to pressure to said flexible pressure vessel.

46. The cellular reservoir flexible pressure vessel, as described in claim 45, further comprising:
a pressure relief device, said pressure relief device comprising either of a weakening and an absence of hoop winding at a predetermined location along said passageway; and
whereby, when said flexible pressure vessel is subjected to an overpressure condition, said pressure vessel will fail at said predetermined location along said passageway.

47. The cellular reservoir flexible pressure vessel, as described in claim 1, wherein said connection to either of a passageway of another vessel and a valve further comprises:
a capillary tube, said capillary tube having a proximate end and a distal end, being formed of resilient material and being sized and shaped to fit slidably within said passageway;
high-strength braiding material, said braiding material disposed about said capillary tube and extending along said capillary tube to within a first predetermined distance from said proximate end;
said proximate end of said braiding covered capillary tube being inserted into said passageway and either of radio frequency welded and secured with adhesive therein;
whereby, when said proximate end of said capillary tube is either of welded and secured with adhesive within said passageway, it will be permanently attached thereto.

* * * * *